United States Patent
Suzuki

(10) Patent No.: US 7,880,417 B2
(45) Date of Patent: Feb. 1, 2011

(54) MOTOR CONTROLLER AND ELECTRIC POWER STEERING APPARATUS

(75) Inventor: Hiroshi Suzuki, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 412 days.

(21) Appl. No.: 12/139,054

(22) Filed: Jun. 13, 2008

(65) Prior Publication Data
US 2008/0309270 A1 Dec. 18, 2008

(30) Foreign Application Priority Data
Jun. 14, 2007 (JP) .............................. 2007-157476

(51) Int. Cl.
*H02P 7/00* (2006.01)
(52) U.S. Cl. ..................... 318/432; 318/434; 318/474; 318/400.02; 318/400.04; 318/400.07; 318/721; 318/722; 702/58; 702/59; 702/185; 702/194; 701/41; 701/42; 701/36; 701/29; 324/117 H
(58) Field of Classification Search ................. 318/432, 318/434, 474, 400.02, 400.04, 400.07, 721, 318/722; 701/41, 42, 36, 29; 180/443–446; 702/58, 59, 185, 194
See application file for complete search history.

(56) References Cited
U.S. PATENT DOCUMENTS

| | | | |
|---|---|---|---|
| 4,251,846 A * | 2/1981 | Pearson et al. ................. | 361/30 |
| 4,697,130 A | 9/1987 | Dadpey et al. | |
| 5,365,153 A | 11/1994 | Fujita et al. | |
| 5,488,281 A * | 1/1996 | Unsworth et al. ........... | 318/806 |
| 5,689,170 A | 11/1997 | Ishikawa | |
| 5,752,209 A | 5/1998 | Nishimoto et al. | |
| 6,037,741 A | 3/2000 | Yamada et al. | |
| 6,130,494 A | 10/2000 | Schöb | |
| 6,297,574 B1 | 10/2001 | Schöb et al. | |
| 6,456,946 B1 * | 9/2002 | O'Gorman ................... | 702/58 |
| 6,504,336 B2 | 1/2003 | Sakamaki | |

(Continued)

FOREIGN PATENT DOCUMENTS

EP 1 527 978 A2 5/2005

(Continued)

OTHER PUBLICATIONS

U.S. Appl. No. 12/036,733, filed Feb. 25, 2008, Suzuki.

(Continued)

*Primary Examiner*—Rita Leykin
(74) *Attorney, Agent, or Firm*—Oblon, Spivak, McClelland, Maier & Neustadt, L.L.P.

(57) ABSTRACT

In a motor controller, in the case that occurrence of a failure of electric current flow is detected in any phase of a motor, a phase electric current command value changing in accordance with a secant curve or a cosecant curve with an asymptotic line at a predetermined rotation angle corresponding to the phase in which the failure of electric current flow has occurred is calculated. The calculated phase electric current command value is limited in such a manner as to become within a predetermined range. In the case that a rotation angle of the motor exists in a range in which the phase electric current command value is limited, the execution of an anomaly detection of a control system utilizing an electric current deviation of a d/q coordinate system is inhibited.

13 Claims, 20 Drawing Sheets

U.S. PATENT DOCUMENTS

| | | | |
|---|---|---|---|
| 6,639,379 B2 | 10/2003 | Matsushita et al. | |
| 6,741,060 B2 | 5/2004 | Krefta et al. | |
| 6,927,548 B2 | 8/2005 | Nishizaki et al. | |
| 7,005,822 B1 | 2/2006 | O'Gorman et al. | |
| 7,084,601 B2 | 8/2006 | Maeda et al. | |
| 7,091,684 B2 * | 8/2006 | Kobayashi et al. | 318/432 |
| 7,141,948 B2 | 11/2006 | Kifuku et al. | |
| 7,161,317 B2 | 1/2007 | Matsushita et al. | |
| 7,161,323 B2 | 1/2007 | Ajima et al. | |
| 7,188,702 B2 | 3/2007 | Takagi et al. | |
| 7,193,388 B1 | 3/2007 | Skinner et al. | |
| 7,199,538 B2 | 4/2007 | Kameya | |
| 7,240,761 B2 | 7/2007 | Nagase et al. | |
| 7,298,109 B2 | 11/2007 | Sakamaki et al. | |
| 7,321,216 B2 | 1/2008 | Suzuki | |
| 7,348,756 B2 | 3/2008 | Ma et al. | |
| 7,394,214 B2 | 7/2008 | Endo et al. | |
| 7,414,425 B2 | 8/2008 | O'Gorman et al. | |
| 7,439,693 B2 | 10/2008 | Shoda et al. | |
| 7,459,879 B2 | 12/2008 | Kezobo et al. | |
| 7,474,067 B2 | 1/2009 | Ueda et al. | |
| 2002/0145837 A1 | 10/2002 | Krefta et al. | |
| 2008/0067960 A1 | 3/2008 | Maeda et al. | |
| 2008/0185983 A1 | 8/2008 | Suzuki | |
| 2008/0203958 A1 | 8/2008 | Suzuki | |
| 2008/0203963 A1 | 8/2008 | Suzuki | |
| 2009/0192665 A1 | 7/2009 | Nozawa | |

FOREIGN PATENT DOCUMENTS

| | | |
|---|---|---|
| EP | 1 527 978 A3 | 5/2005 |
| EP | 1 737 116 A1 | 12/2006 |
| JP | 2003-026020 | 1/2003 |
| JP | 2006-067731 | 3/2006 |

OTHER PUBLICATIONS

U.S. Appl. No. 12/128,304, filed May 28, 2008, Suzuki.
U.S. Appl. No. 12/209,524, filed Sep. 12, 2008, Suzuki.
U.S. Appl. No. 12/212,165, filed Sep. 17, 2008, Suzuki.

* cited by examiner

When a failure of electric current flow has occurred in the U phase

When a failure of electric current flow has occurred in the U phase

When a failure of electric current flow has occurred in the V phase

When a failure of electric current flow has occurred in the W phase

When a failure of electric current flow has occurred in the U phase

When a failure of electric current flow has occurred in the V phase

MOTOR CONTROLLER AND ELECTRIC POWER STEERING APPARATUS

CROSS-REFERENCE TO RELATED APPLICATIONS

This application is based on and claims priority from Japanese Patent Application No. 2007-157476 filed on Jun. 14, 2008, the entire contents of which are incorporated herein by reference.

BACKGROUND OF THE INVENTION

The present invention relates to a motor controller and an electric power steering apparatus having the motor controller.

In many cases, a motor controller provided in an electric power steering apparatus (EPS) includes anomaly detecting means that detects an anomaly such as a failed electric current flow caused in any one of phases of a motor, that is, U, V, or W-phase, due to a break of a power supply cable or a failed contact of a driver circuit. Normally, if an anomaly is detected by the anomaly detecting means, the motor is quickly stopped to perform fail-safe. This greatly changes steering characteristics of the EPS, requiring the driver to increase the force applied to the steering wheel.

In this regard, for example, Japanese Laid-Open Patent Publication No. 2003-26020 discloses a motor controller that continuously operates a motor using two phases other than a phase with a failed electric current flow even after such failure has been detected in the phase. In this manner, assist force is continuously applied to a steering system so as to assist in manipulation of a steering wheel by the driver. This suppresses increase of load on the driver.

However, even if the motor is continuously actuated in the manner described above by two phases other than the phase in which a failure of electric current flow has occurred, in the case that the sinusoidal electric current is fed to each of these two phases (in the case that the sinusoidal electric current is fed to the V-phase and the W-phase while a failure of electric current flow has occurred in the U-phase, for example, as shown in FIG. 27), a torque ripple is caused and steering comfort is decreased due to the torque ripple. Specifically, with reference to FIG. 28 in which change of the motor electric current in the two phase drive mode is represented in a d/q coordinate system, the actual q-axis electric current value changes in a sinusoidal manner despite a constant q-axis electric current command value, which is a target control value of the motor torque. Thus, the motor is continuously operated without obtaining a motor electric current matching a required torque.

Further, in many cases, the detection of an anomaly in the control system such as the generation of an overcurrent caused by a failure of the drive circuit and a sensor anomaly is carried out on the basis of a comparison between an electric current deviation in the d/q coordinate system (mainly the q-axis electric current deviation), and a predetermined threshold value (for example, refer to Japanese Laid-Open Patent Publication No. 2006-67731). However, since each of the electric current values is changed in the sinusoidal shape in the d/q coordinate system at a time of the two-phase drive mode, as described above, the electric current deviation is generated regardless of whether there is an anomaly in the control system. Accordingly, there is a problem that an anomaly cannot be detected at a time of the two-phase drive mode.

SUMMARY OF THE INVENTION

Accordingly, an objective of the present invention is to provide a motor controller and an electric power steering apparatus that accurately detect an anomaly while effectively suppressing a generation of a torque ripple at a time of a two-phase drive mode caused by a failed electric current flow generated in any one of phases of a motor.

To achieve the foregoing objective and in accordance with a first aspect of the present invention, a motor controller including a motor control signal output section and a drive circuit feeding a three phase drive power to a motor on the basis of a motor control signal output from the motor control signal output section is provided. The motor control signal output section includes an electric current command value calculating section, a motor control signal generating section, and an anomaly detecting section. The motor control signal generating section generates the motor control signal by executing an electric current feedback control of a d/q coordinate system on the basis of an electric current command value calculated by the electric current command value calculating section. The anomaly detecting section detects an anomaly of a control system on the basis of an electric current deviation of the d/q coordinate system, and detects a failure of electric current flow in any of the phases of the motor. In a case that a failure of electric current flow occurred in any of the phases of the motor is detected by the anomaly detecting section, the electric current command value calculating section calculates a phase electric current command value changing in accordance with a secant curve or a cosecant curve with an asymptotic line at a predetermined rotation angle corresponding to the phase in which the failure of electric current flow has occurred, and the motor control signal generating section generates a motor control signal for energizing the other two phases than the phase in which the failure of electric current flow has occurred by executing a phase electric current feedback control on the basis of the calculated phase electric current command value. The motor control signal output section is provided with a guarding section for limiting the phase electric current command value calculated by the electric current command value calculating section within a predetermined range. In the case of detecting that a failure of electric current flow has occurred in any of the phases of the motor, the anomaly detecting section inhibits the anomaly detection of the control system if the rotation angle of the motor exists in the range in which the phase electric current command value is limited by the guarding section.

In accordance with a second aspect of the present invention, a motor controller including a motor control signal output section, and a drive circuit feeding a three phase drive power to a motor on the basis of a motor control signal output from the motor control signal output section is provided. The motor control signal output section includes an electric current command value calculating section, a motor control signal generating section, and an anomaly detecting section. The motor control signal generating section generates the motor control signal by executing an electric current feedback control of a d/q coordinate system on the basis of an electric current command value calculated by the electric current command value calculating section. The anomaly detecting section detects an anomaly of a control system on the basis of a comparison between an electric current deviation of the d/q coordinate system and a predetermined threshold value, and detecting a failure of electric current flow in any of the phases of the motor. In a case that a failure electric current flow occurred in any of the phases of the motor is detected by the anomaly detecting section, the electric current command value calculating section calculates a phase electric current command value changing in accordance with a secant curve or a cosecant curve with an asymptotic line at a predetermined rotation angle corresponding to the phase in which the failure of electric current flow has occurred, and the motor control signal generating section generates a motor control signal for energizing the other two phases than the phase in which the failure of electric current flow has occurred by executing a phase electric current feedback control on the basis of the calculated phase electric current command value. The motor control signal output section is provided with a guarding section for limiting the phase electric current command value calculated by the electric current command value calculating section within a predetermined range. In the case of detecting that a failure of electric current flow has occurred in any of the phases of the motor, the anomaly detecting section changes the threshold value so as to correspond to a fluctuation of the electric current deviation of the d/q coordinate system generated by the limitation of the phase electric current command value if the rotation angle of the motor exists in the range in which the phase electric current command value is limited by the guarding section.

In accordance with a third aspect of the present invention, a motor controller including a motor control signal output section, and a drive circuit feeding a three phase drive power to a motor on the basis of a motor control signal output from the motor control signal output section is provided. The motor control signal output section includes an electric current command value calculating section, a motor control signal generating section and an anomaly detecting section. The motor control signal generating section generates the motor control signal by executing an electric current feedback control of a d/q coordinate system on the basis of an electric current command value calculated by the electric current command value calculating section. The anomaly detecting section detects an anomaly of a control system on the basis of an electric current deviation of the d/q coordinate system, and detects a failure of electric current flow in any of the phases of the motor. In a case that a failure of electric current flow occurred in any of the phases of the motor is detected by the anomaly detecting section, the electric current command value calculating section calculates a phase electric current command value changing in accordance with a secant curve or a cosecant curve with an asymptotic line at a predetermined rotation angle corresponding to the phase in which the failure of electric current flow has occurred, and the motor control signal generating section generates a motor control signal for energizing the other two phases than the phase in which the failure of electric current flow has occurred, by executing a phase electric current feedback control on the basis of the calculated phase electric current command value. The motor control signal output section is provided with a guarding section for limiting the phase electric current command value calculated by the electric current command value calculating section within a predetermined range. In the case of detecting that a failure of electric current flow has occurred in any of the phases of the motor, the anomaly detecting section calculates a hypothetical electric current command value of the d/q coordinate system, the hypothetic electric current command value corresponding to the phase electric current command value calculated by the electric current command value calculating section, and the anomaly detecting section executes the anomaly detection of the control system on the basis of a deviation between the calculated hypothetical electric current value and an actual electric current value of the d/q coordinate system.

In accordance with a fourth aspect of the present invention, a motor controller including a motor control signal output section, and a drive circuit feeding a three phase drive power to a motor on the basis of a motor control signal output from the motor control signal output section is provided. The motor control signal output section includes an electric current command value calculating section, a motor control signal generating section, and an anomaly detecting section. The motor control signal generating section generates the motor control signal by executing an electric current feedback control of a d/q coordinate system on the basis of an electric current command value calculated by the electric current command value calculating section. The anomaly detecting section detects an anomaly of a control system and a failure of electric current flow in any of the phases of the motor. In a case that a failure of electric current flow occurred in any of the phases of the motor is detected by the anomaly detecting section, the electric current command value calculating section calculates a phase electric current command value changing in accordance with a secant curve or a cosecant curve with an asymptotic line at a predetermined rotation angle corresponding to the phase in which a failure of electric current flow has occurred, and the motor control signal generating section generates a motor control signal for energizing the other two phases than the phase in which the failure of electric current flow has occurred, by executing a phase electric current feedback control on the basis of the calculated phase electric current command value. The anomaly detecting section executes the anomaly detection of the control system on the basis of a phase electric current deviation of at least one of two phases in which the failed electric current flow is not generated, in the case of detecting that a failure of electric current flow has occurred in any of the phases of the motor.

In accordance with a fifth aspect of the present invention, a motor controller including a motor control signal output section and a drive circuit feeding a three phase drive power to a motor on the basis of a motor control signal output from the motor control signal output section is provided. The motor control signal output section includes an electric current command value calculating section, a motor control signal generating section, and an anomaly detecting section. The motor control signal generating section generates the motor control signal by executing an electric current feedback control on the basis of an electric current command value calculated by the electric current command value calculating section. The anomaly detecting section detects an anomaly of a control system and a failure of electric current flow in any of the phases of the motor. In a case of detecting that the failure of electric current flow has occurred in any of the phases of the motor, the anomaly detecting section executes the anomaly detection of the control system on the basis of a total value of the phase electric current values of two phases in which the failure of electric current flow has not been generated.

In accordance with a sixth aspect of the present invention, an electric power steering apparatus that includes any of the above described motor controller is provided.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

A first embodiment of the present invention will now be described with reference to FIGS. 1 to 12.

Figure 1:
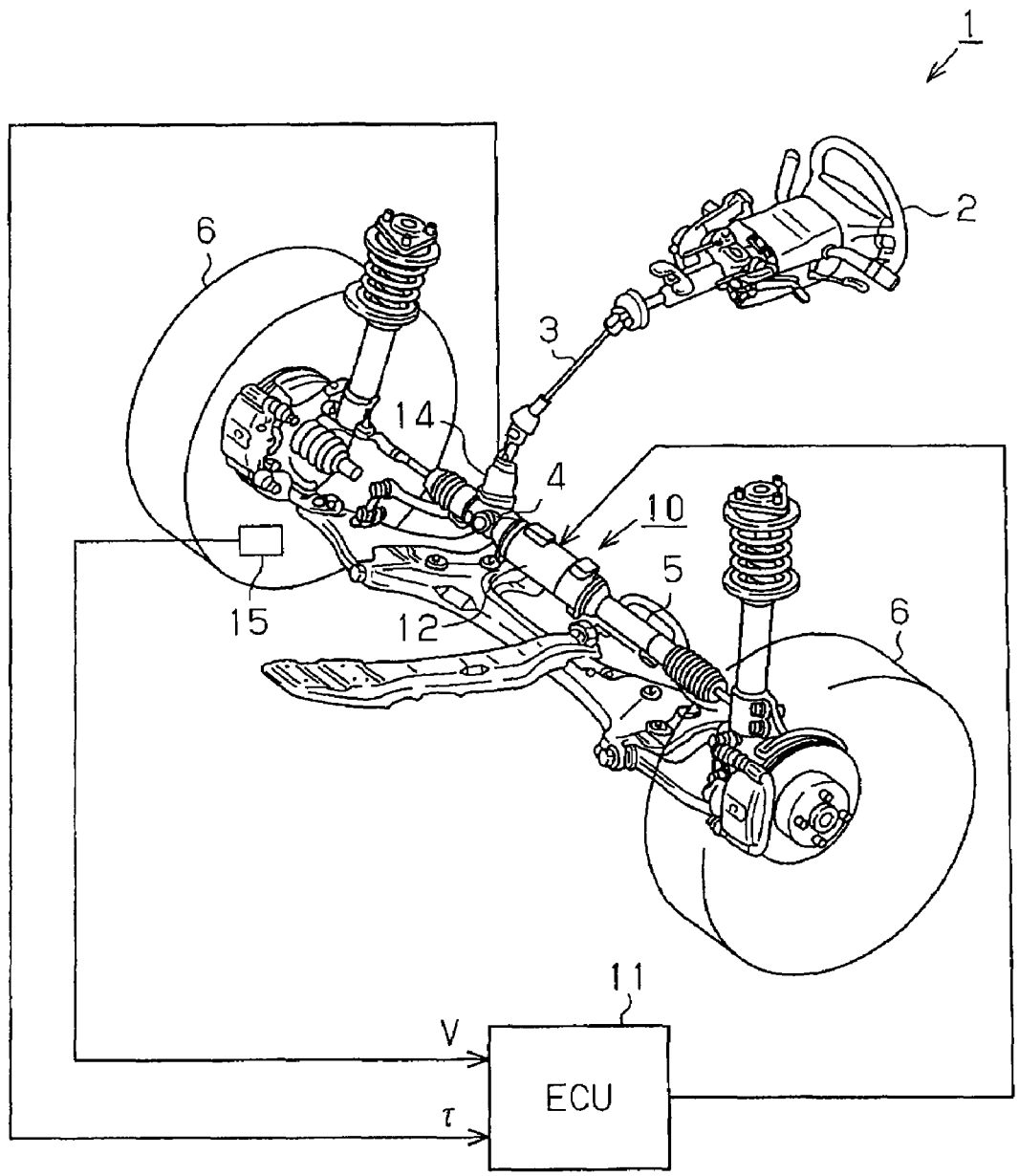
FIG. 1 is a schematic view showing an electric power steering apparatus (EPS) in accordance with a first embodiment of the present invention.

As shown in FIG. 1, a vehicle with an electric power steering apparatus (EPS) 1 according to the first embodiment includes a steering shaft 3 extending from a steering wheel 2. The steering shaft 3 is connected to a rack 5 through a rack and pinion mechanism 4. As the steering wheel 2 is manipulated, the steering shaft 3 rotates. Such rotation is converted into linear reciprocation of the rack 5 through the rack and pinion mechanism 4. As the rack 5 linearly reciprocates, steering angles of steerable wheels 6 change.

The EPS 1 includes an EPS actuator 10 and an ECU 11. The EPS actuator 10 is a steering force assisting device that applies assist force to a steering system of the vehicle to assist in manipulation of the steering wheel 2 by the driver. The ECU 11 serves as control means (a control section) that controls operation of the EPS actuator 10.

The EPS actuator 10 is a rack type EPS actuator driven by a motor 12. The motor 12 is arranged coaxially with the rack 5. The motor 12 generates assist torque, which is transmitted to the rack 5 through a non-illustrated ball screw mechanism. The motor 12 is a brushless motor and rotates when driven by drive power of three phases, or U, V, and W-phases, which is supplied by the ECU 11. The ECU 11 adjusts the assist torque produced by the motor 12 in such a manner as to apply an appropriate level of assist force to the steering system (power assistance control). In other words, the ECU 11 functions as a motor controller.

A torque sensor 14 and a vehicle speed sensor 15 are connected to the ECU 11. Based on a steering torque τ and a vehicle speed V, which are detected by the torque sensor 14 and the vehicle speed sensor 15, respectively, the ECU 11 controls operation of the EPS actuator 10, and performs the power assistance control.

The electric configuration of the EPS 1 will hereafter be explained.

Figure 2:
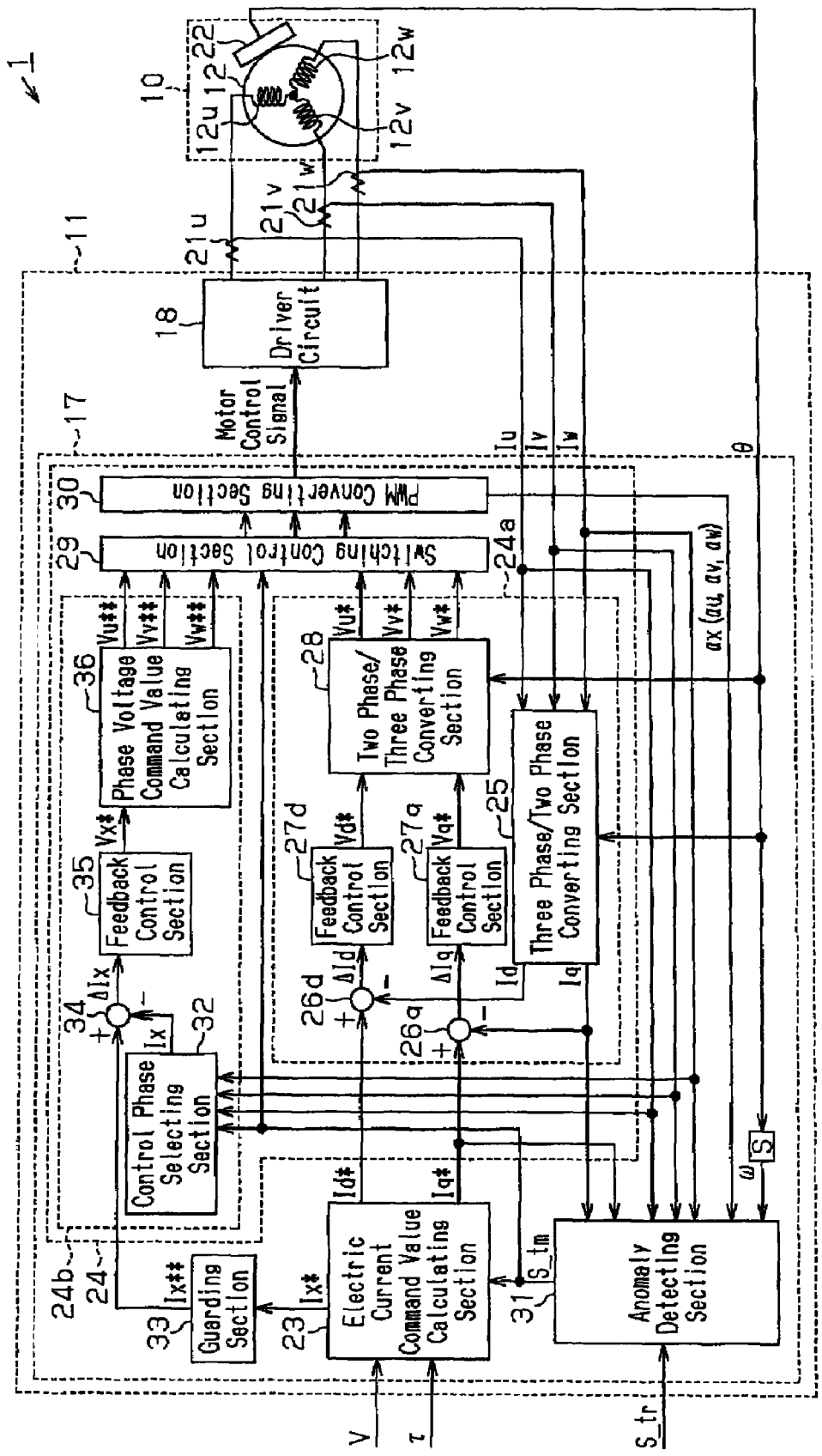
FIG. 2 is a block diagram representing the electric configuration of the EPS of FIG. 1.

As illustrated in FIG. 2, which is the block diagram representing the EPS 1, the ECU 11 has a microcomputer 17 and a driver circuit 18. The microcomputer 17 serves as a motor control signal output section (motor control signal outputting means) that outputs a motor control signal. The driver circuit 18 supplies the three phase drive power to the motor 12 based on the motor control signal output by the microcomputer 17.

The driver circuit 18 is a known PWM inverter that is configured by connecting three arms corresponding to the respective three phases in parallel. Each of the arms includes a pair of switching elements that are connected in series. The motor control signal, which is output by the microcomputer 17, defines the ON duty ratio of each of the switching elements. When the motor control signal is provided to the gate terminal of each switching element, the switching element is turned selectively on and off in response to the motor control signal. This converts DC voltage of a non-illustrated power source mounted in the vehicle to the three phase drive power. The drive power is then fed to the motor 12.

The ECU 11 has electric current sensors $21u$, $21v$, $21w$ and a rotation angle sensor 22. Each of the electric current sensors $21u$, $21v$, $21w$ detects the corresponding one of phase electric current values Iu, Iv, Iw, which are values of phase electric currents supplied to the motor 12. The rotation angle sensor 22 detects a rotation angle θ of the motor 12. Based on the phase electric current values Iu, Iv, Iw and the rotation angle θ of the motor 12, and the steering torque τ and the vehicle speed V, the microcomputer 17 provides the motor control signal to the driver circuit 18.

In a normal state, to generate the motor control signal, the microcomputer 17 converts the phase electric current values Iu, Iv, Iw into a d-axis electric current value Id and a q-axis electric current value Iq of a d/q coordinate system. The microcomputer 17 thus performs feedback control on the electric currents in the d/q coordinate system.

The microcomputer 17 includes an electric current command value calculating section (electric current command value calculating means) 23 and a motor control signal generating section (motor control signal generating means) 24. The electric current command value calculating section 23 calculates an electric current command value as a target control value of the assist force to be applied to the steering system, that is, the motor torque. More specifically, in the normal state, the electric current command value calculating section 23 calculates a d-axis electric current command value Id* and a q-axis electric current command value Iq* based on the steering torque τ and the vehicle speed V, which are detected by the torque sensor 14 and the vehicle speed sensor 15, respectively. The electric current command value calculating section 23 then outputs the obtained d-axis electric current command value Id* and q-axis electric current command value Iq* to the motor control signal generating section 24. Along with the d-axis electric current command value Id* and the q-axis electric current command value Iq* provided by the electric current command value calculating section 23, the motor control signal generating section 24 receives the phase electric current values Iu, Iv, Iw provided by the electric current sensors $21u$, $21v$, $21w$ and the rotation angle θ provided by the rotation angle sensor 22. Thus, based on the phase electric current values Iu, Iv, Iw and the rotation angle θ (an electric angle), the motor control signal generating section 24 performs the feedback control on the electric currents in the d/q coordinate system. As a result, the motor control signal is generated based on the electric current command values determined by the electric current command value calculating section 23, which are the d-axis electric current command value Id* and the q-axis electric current command value Iq*.

The motor control signal generating section 24 has a first control section 24a, which calculates phase voltage command values Vu*, Vv*, Vw* through the feedback control on the electric currents in the d/q coordinate system. In the normal state, the motor control signal generating section 24 produces the motor control signal based on the phase voltage command values Vu*, Vv*, Vw*.

More specifically, the phase electric current values Iu, Iv, Iw are input to a three phase/two phase converting section 25 of the first control section 24a, together with the rotation angle θ. The three phase/two phase converting section 25 converts the phase electric current values Iu, Iv, Iw into the d-axis electric current value Id and the q-axis electric current value Iq of the d/q coordinate system. The q-axis electric current command value Iq*, which is output by the electric current command value calculating section 23, is input to a subtractor $26q$, along with the q-axis electric current value Iq. The d-axis electric current command value Id*, which is output by the electric current command value calculating section 23, is input to a subtractor $26d$, together with the d-axis electric current value Id. In the illustrated embodiment, the electric current command value calculating section 23 outputs zero as the d-axis electric current command value Id*. The subtractor $26d$ obtains a d-axis electric current deviation ΔId and the subtractor $26q$ obtains a q-axis electric current deviation ΔIq. The d-axis electric current deviation ΔId and the q-axis electric current deviation ΔIq are input to a feedback control section $27d$ and a feedback control section $27q$, respectively. The feedback control sections $27d$, $27q$ each carry out feedback control in such a manner that the d-axis electric current value Id and the q-axis electric current value Iq follow the d-axis electric current command value Id* and the q-axis electric current command value Iq*, respectively.

Specifically, the feedback control section $27d$ multiplies the d-axis electric current deviation ΔId provided by the subtractor $26d$ by a predetermined feedback gain (a PI gain), and thus obtains a d-axis voltage command value Vd*. The feedback control section $27q$ multiplies the q-axis electric current deviation ΔIq input by the subtractor $26q$ by a predetermined feedback gain (a PI gain), and thus obtains a q-axis voltage command value Vq*. The d-axis voltage command value Vd* and the q-axis voltage command value Vq* are input to a two phase/three phase converting section 28, along with the rotation angle θ. The two phase/three phase converting section 28 converts the d-axis voltage command value Vd* and the q-axis voltage command value Vq* to phase voltage command values Vu*, Vv*, Vw*.

The phase voltage command values Vu*, Vv*, VW* are input to a PWM converting section 30 through a switching control section 29. The PWM converting section 30 generates duty command values αu, αv, αw in correspondence with the phase voltage command values Vu*, Vv*, Vw*. The motor control signal generating section 24 generates a motor control signal having an ON duty ratio commanded by the duty command values αu, αv, αw. The microcomputer 17 outputs the motor control signal to the gate terminal of each switching element of the driver circuit 18. In this manner, the operation of the driver circuit 18, or the supply of the drive power to the motor 12, is controlled.

(Control when Anomaly Occurs)

With reference to FIG. 2, the microcomputer 17 of the ECU 11 has an anomaly detecting section (anomaly detecting means) 31, which detects an anomaly of the EPS 1 and identifies the nature of the anomaly. The ECU 11 (the microcomputer 17) changes control modes of the motor 12 in correspondence with the nature of the anomaly identified by the anomaly detecting section 31.

An anomaly signal S_tr, which informs the occurrence of an anomaly in the mechanical system of the EPS actuator 10, is input to the anomaly detecting section 31. In response to receiving the anomaly signal S_tr, the anomaly detecting section 31 detects an anomaly in the mechanical system of the EPS 1. Also, state quantities such as the q-axis electric current command value Iq*, the q-axis electric current value Iq, the phase electric current values Iu, Iv, Iw, the rotation angular velocity ω of the motor 12, and the duty command values αu, αv, αw are input to the anomaly detecting section 31. Based on these state quantities, the anomaly detecting section 31 detects an anomaly in the control system. Specifically, the anomaly detecting section 31 monitors a q-axis electric current deviation ΔIq to detect an anomaly relating to the control system such as a failure of the torque sensor 14, a failure of the driver circuit 18 or the like, and determines that there is an anomaly in the control system in the case that the q-axis electric current deviation ΔIq is equal to or more than a predetermined threshold value over a predetermined time. Further, based on the phase electric current values Iu, Iv, Iw, the rotation angular velocity ω, and the duty command values αu, αv, αw, the anomaly detecting section 31 detects a failure of electric current flow in any one of the phases of the motor 12 caused by a break of a power cable (including a motor coil) or a failed contact of the driver circuit 18.

If a phase electric current value Ix (=Iu, Iv, or Iw) of X phase is smaller than or equal to a predetermined value Ith (|Ix|≦Ith) and the rotation angular velocity ω is smaller than or equal to a predetermined value ω0 ($\sqrt[3]{\omega}|\leqq\omega0$), failure of an electric current flow is detected in the phase depending on whether the duty command value αx (=αu, αv, or αw) corresponding to the phase is continuously maintained outside a predetermined range corresponding to the values Ith and ω0, which range is greater than or equal to a predetermined value αLo and smaller than or equal to a predetermined value αHi (αLo≦αx≦αHi).

The value Ith for the phase electric current value Ix is set to zero or a value approximate to zero. The value ω0 for the rotation angular velocity ω is set to the value corresponding to the base speed (the maximum number of rotation) of the motor 12. The value αLo for the duty command value αx is set to a value smaller than the minimum value of the duty command value αx in the normal state. The value αHi for the duty command value αx is set to a value greater than the maximum value of the duty command value αx in the normal state.

Figure 3:
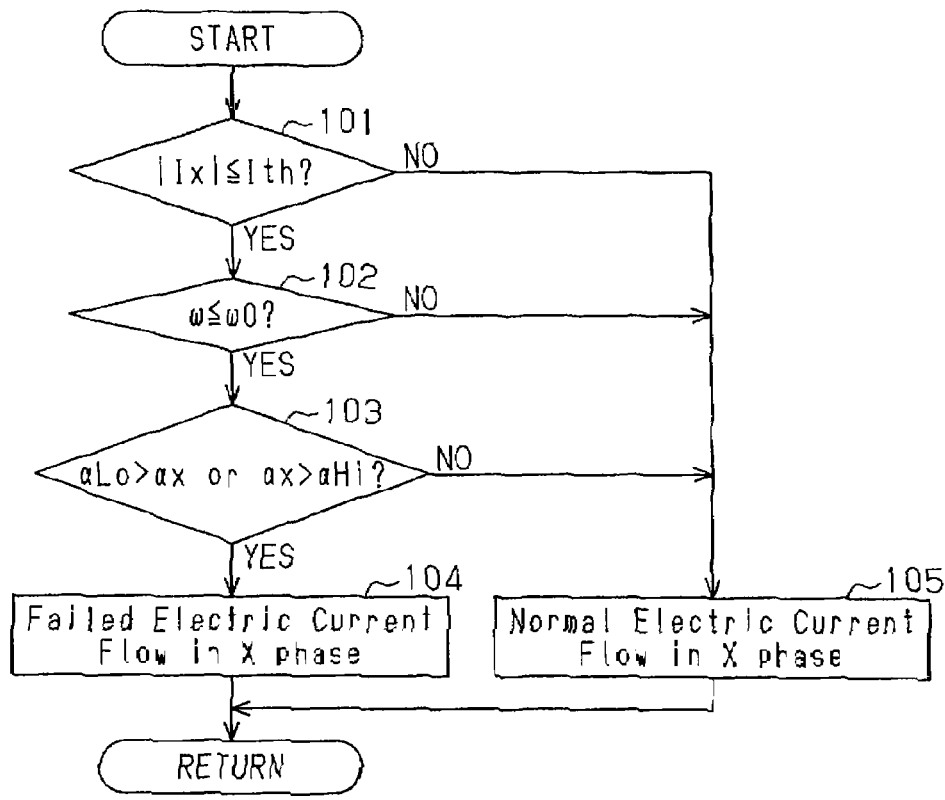
FIG. 3 is a flowchart representing a routine carried out by the EPS of FIG. 1 to determine whether an anomaly has occurred.

In other words, with reference to FIG. 3, the anomaly detecting section 31 determines whether (the absolute value of) the phase electric current value Ix of the X phase, which is detected by one of the electric current sensors 21u, 21v, 21w, is smaller than or equal to the value Ith in step 101. If it is determined that the phase electric current value Ix is smaller than or equal to the value Ith (step 101: YES), the anomaly detecting section 31 determines whether (the absolute value of) the rotation angular velocity ω is smaller than or equal to the value ω0 in the subsequent step 102. If it is determined that the rotation angular velocity ω is smaller than or equal to the value ω0 (step 102: YES), the anomaly detecting section 31 determines, in the subsequent step 103, whether the duty command value αx is smaller than the value αLo or greater than the value αHi. If it is determined that the duty command value αx is smaller than the value αLo or greater than the value αHi (step 103: YES), the anomaly detecting section 31 determines that a failure of electric current flow has likely occurred in the X phase in step 104.

If it is determined that the phase electric current value Ix is greater than the predetermined value Ith (step 101: NO), that the rotation angular velocity ω is greater than the value ω0 (step 102: NO), or that the duty command value αx is greater than or equal to the value αLo and smaller than or equal to the value αHi (step 103: NO), the anomaly detecting section 31 determines that the X phase is free from a failure of electric current flow in step 105.

If a failure of electric current flow occurs in the X phase, the phase electric current value Ix of the X phase drops to zero. The followings are two other possible cases in which the phase electric current value Ix of the X phase becomes zero or a value approximate to zero, other than the failed electric current flow.

The rotation angular velocity ω of the motor 12 reaches the base speed (the maximum number of rotation).

The electric current command value is zero or a value approximate to zero.

Thus, the anomaly detecting section 31 compares the phase electric current value Ix of the X phase with the value Ith, which is set to zero or a value approximate to zero. In this manner, the anomaly detecting section 31 determines whether the phase electric current value Ix is zero or a value approximate to zero (step 101). The anomaly detecting section 31 then determines whether the phase electric current value Ix is zero or a value approximate to zero due to a case other than the failed electric flow, which is any one of the above listed two cases (steps 102, 103). If the two cases are both ruled out, the anomaly detecting section 31 determines that it is likely that a failed electric current flow has occurred in the X phase. That is, if the duty command value αx reaches an extreme level without increase of the rotation angular velocity ω of the motor 12 to the level at which the phase electric current value Ix drops to zero or a value approximate to zero, that is, a value smaller than or equal to the value Ith, the anomaly detecting section 31 determines that a failure of electric current flow has likely occurred in the X phase. The anomaly detecting section 31 carries out the routine of FIG. 3 to determine whether an anomaly has occurred, for the respective one of the U, V, and W-phases.

Although omitted from FIG. 3 for the illustrative purposes, the routine of anomaly determination is performed only when the voltage of the power supply is greater than or equal to a specified voltage necessary to drive the motor 12. The anomaly detecting section 31 makes a final determination that a failed electric current flow has occurred in the X phase in step 104 only when the determination that the failed electric current flow has likely occurred in the X phase is continuously maintained exceeding a predetermined time.

Based on the result of the determination by the anomaly detecting section 31, the ECU 11 (the microcomputer 17) switches the control modes of the motor 12. Specifically, the anomaly detecting section 31 outputs the result of the determination as an anomaly detection signal S_tm. The electric current command value calculating section 23 and the motor control signal generating section 24 calculate the electric current command values and generate the motor control signal in correspondence with the anomaly detection signal S_tm, which is output by the anomaly detecting section 31. This switches the control modes of the motor 12 operated by the microcomputer 17.

More specifically, the ECU 11 operates in accordance with three control modes, which are a "normal mode" for the normal state, an "assist suspension mode" for when an anomaly has occurred and thus the motor 12 needs to be stopped, and a "two phase drive mode" for when a failure of electric current flow has occurred in any one of the phases of the motor 12. As long as the anomaly detection signal S_tm provided by the anomaly detecting section 31 corresponds to the normal control mode, the electric current command value calculating section 23 calculates the d-axis electric current command value Id* and the q-axis electric current command value Iq* in the above-described manner for the normal state, while the motor control signal generating section 24 generates the motor control signal also in the above-described manner for the normal state.

If the anomaly detection signal S_tm provided by the anomaly detecting section 31 corresponds to the assist suspension mode, the electric current command value calculating section 23 calculates the d-axis electric current command value Id* and the q-axis electric current command value Iq* and the motor control signal generating section 24 generates the motor control signal in such a manner as to stop the motor 12. The control mode of the ECU 11 is switched to the assist suspension mode if an anomaly is caused in the mechanical system or the torque sensor 14 or an anomaly such as an overcurrent is caused in the power supply system. In accordance with the assist suspension mode, the motor 12 may be stopped immediately. Alternatively, the motor 12 may be stopped by gradually reducing the output of the motor 12, or the assist force. In the latter case, (the absolute value of) the q-axis electric current command value Iq*, which is provided by the electric current command value calculating section 23, gradually decreases. After stopping the motor 12, the microcomputer 17 switches the switching elements of the driver circuit 18 to open states and opens a non-illustrated power source relay.

If the anomaly detection signal S_tm provided by the anomaly detecting section 31 corresponds to the two phase drive mode, the motor control signal generating section 24 generates the motor control signal to energize the two phases other than the phase with the failed electric current flow. The anomaly detection signal S_tm corresponding to the two phase drive mode carries information needed for identifying the phase in which the failure of electric current flow has occurred.

In the two phase drive mode, the electric current command value calculating section 23 calculates the phase electric current command values in such a manner as to produce the motor electric current (the q-axis electric current value Iq) matching the required torque, or the target control value of the motor torque (the q-axis electric current command value Iq*), except for at specific rotation angles corresponding to the phase with the failed electric current flow. The motor control signal generating section 24 generates the motor control signal by performing feedback control on the phase electric currents with reference to the corresponding phase electric current command values.

Specifically, if the anomaly detection signal S_tm output by the anomaly detecting section 31 corresponds to the two phase drive mode, the electric current command value calculating section 23 calculates the phase electric current command value for one of the two correct functioning phases using one of the following expressions (1), (2), and (3), depending on the phase in which the failure of electric current flow has occurred.

If the failure of electric current flow has occurred in the U-phase:

$$I_v^* = \frac{I_q^*}{\sqrt{2} \cos\theta} \tag{1}$$

If the failure of electric current flow has occurred in the V-phase:

$$I_u^* = \frac{-I_q^*}{\sqrt{2} \sin\left(\theta - \frac{\pi}{6}\right)} \tag{2}$$

If the failure of electric current flow has occurred in the W-phase:

$$I_v^* = \frac{I_q^*}{\sqrt{2} \sin\left(\theta + \frac{\pi}{6}\right)} \tag{3}$$

Figure 4:
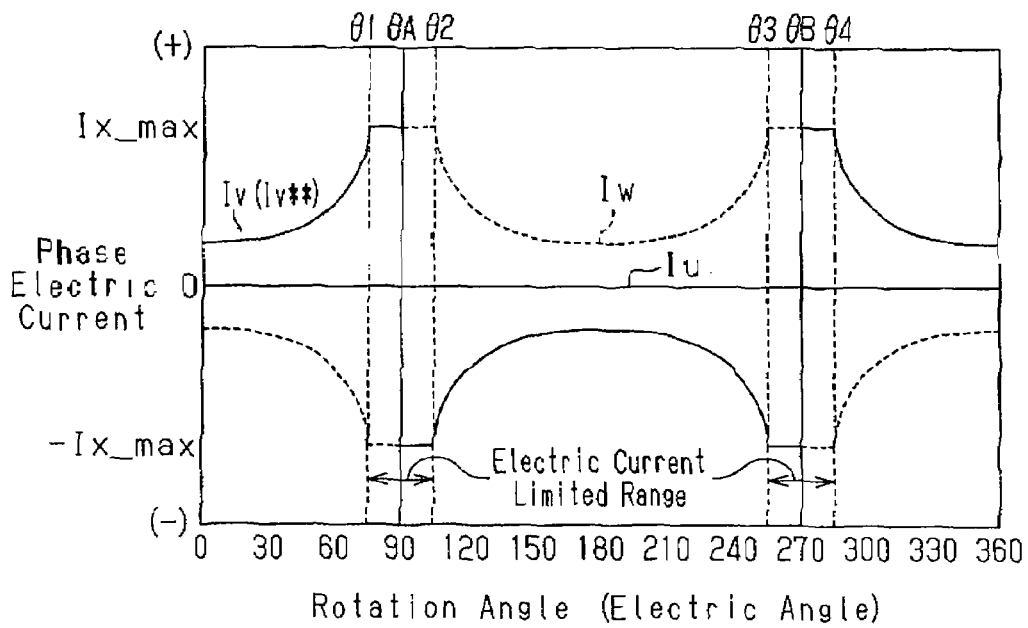
FIG. 4 is a graph showing changes of phase electric currents at a time of a two phase drive mode of the EPS of FIG. 1 in the case that a failure of electric current flow has occurred in a U-phase.
Figure 5:
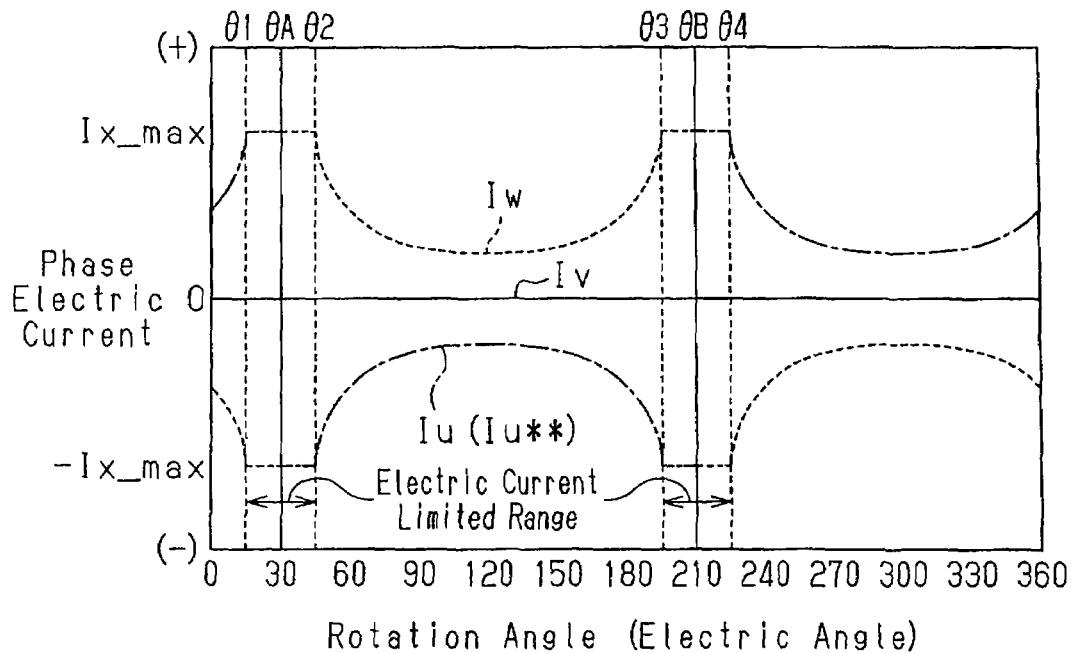
FIG. 5 is a graph showing changes of phase electric currents at a time of a two phase drive mode of the EPS of FIG. 1 in the case that a failure of electric current flow has occurred in a V-phase.
Figure 6:
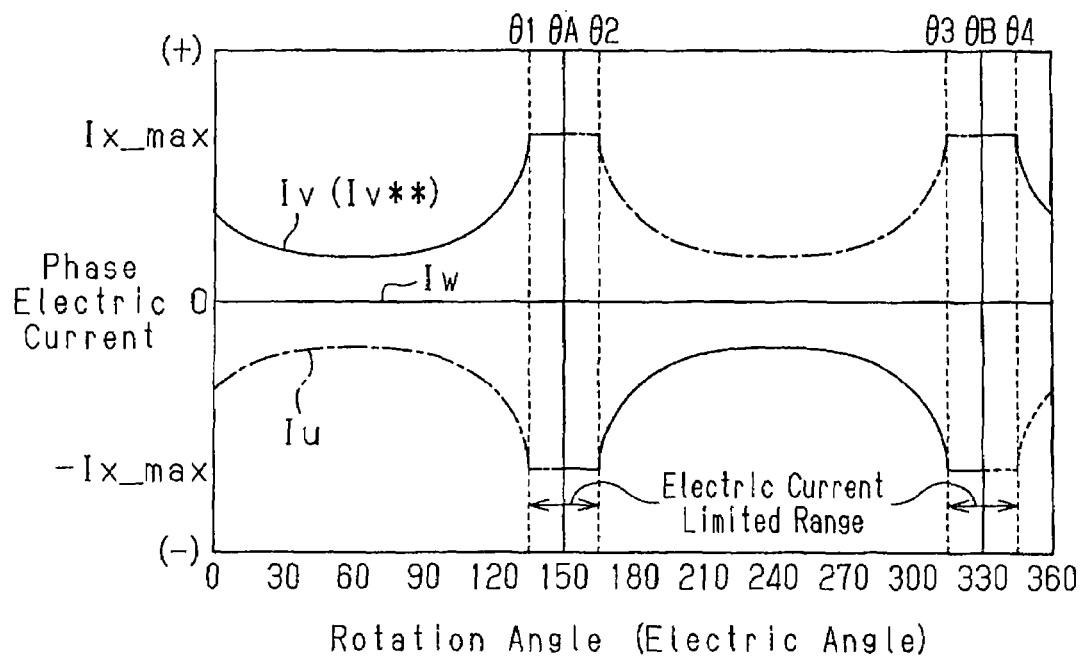
FIG. 6 is a graph showing changes of phase electric currents at a time of a two phase drive mode of the EPS of FIG. 1 in the case that a failure of electric current flow has occurred in a W-phase.

The phase electric current command values calculated using the expressions (1) to (3) change in accordance with a secant curve (inverse of cosine) or a cosecant curve (inverse of sine) with asymptotic lines at specific rotation angles θA, θB (θA<θB) corresponding to the phase with the failed electric current flow. With reference to FIG. 4, in which a failure of electric current flow has occurred in the U-phase but normal electric current flows are maintained in the V and W-phases, the rotation angle θA and the rotation angle θB are 90° and 270°, respectively. With reference to FIG. 5, in which a failure of electric current flow has occurred in the V-phase but normal electric current flows are maintained in the U and W-phases, the rotation angle θA and the rotation angle θB are 30° and 210°, respectively. With reference to FIG. 6, in which a failure of electric current flow has occurred in the W-phase but normal electric current flows are maintained in the U and V-phases, the rotation angle θA and the rotation angle θB are 150° and 330°, respectively.

Since each of the motor coils 12u, 12v and 12w of the U, V and W phases actually has an upper limit of (an absolute value of) an applicable electric current, a guarding procedure described below for limiting the value within a predetermined range is carried out with respect to a phase electric current command value calculated by the expressions (1) to (3) mentioned above. Accordingly, the absolute value of the phase electric current command value takes a fixed maximum value at a time when a rotation angle is within a predetermined range, and at a time when the rotation angle is in a range from θ1 to θ2 and a range from θ3 to θ4 in the example shown in FIGS. 4 to 6.

In accordance with the motor control signal produced based on the thus obtained phase electric current command values, the motor 12 is operated. This generates the motor electric current (the q-axis electric current value Iq) matching the required torque (the q-axis electric current command value Iq*), except for at the rotation angles θA, θB. In the case that the guarding procedure is applied to the phase electric current command value such as the present embodiment, the motor electric current (the q-axis electric current value Iq) matching the required torque (the q-axis electric current command value Iq*) is generated except the range near each of the rotation angles θA and θB, and except the range in which the rotation angle is from θ1 to θ2 and from θ to θ4 in the example shown in FIGS. 7 to 9. Therefore, a torque ripple is suppressed regardless of which of the phases of the motor 12 has caused a failed electric current flow. As a result, while maintaining satisfactory steering comfort, the assist force is continuously applied to the steering system.

More specifically, as illustrated in FIG. 2, the motor control signal generating section 24 has a second control section 24b, which calculates phase voltage command values Vu, Vv, Vw** by performing feedback control on the phase electric currents in correspondence with a phase electric current command value Ix* (=Iu*, Iv*, or Iw*) provided by the electric current command value calculating section 23. If the anomaly detection signal S_tm of the anomaly detecting section 31 corresponds to the two phase drive mode, the motor control signal generating section 24 generates the motor control signal based on the phase voltage command values Vu, Vv, Vw obtained by the second control section 24b. The second control section 24b performs feedback control exclusively on a control phase, which is one of the two phases other than the phase with the failed electric current flow. In this manner, the second control section 24b obtains the phase voltage command value for the control phase. Based on the phase voltage command value, the second control section 24b determines the phase voltage command values Vu, Vv, Vw. In other words, based on the phase voltage command value, the second control section 24b determines the remaining two of the phase voltage command values.

Specifically, the second control section 24b has a control phase selecting section 32, which receives the phase electric current values Iu, Iv, Iw and the anomaly detection signal S_tm. In accordance with the anomaly detection signal S_tm, the control phase selecting section 32 selects the phase for which the phase electric current is feedback controlled, that is, the control phase, from the two phases other than the phase with the failed electric current flow.

The phase electric current command value Ix* output from the electric current command value calculating section 23 is input to the guarding section (guarding means) 33. The guarding section 33 executes a guarding procedure so as to limit the input phase electric current command value Ix* within a predetermined range. Specifically, the guarding section 33 limits (the absolute value of) the phase electric current command value Ix* within the range represented by the following expression (4) so as to output the limited value as the phase electric current command value Ix**.

$$-Ix\_max \leq Ix^{**} \leq Ix\_max \quad (4)$$

In the expression (4), the value Ix_max is the upper limit of the electric current that can be supplied to the X phase (the U, V, or W-phase). The upper limit is determined in accordance with the rated current or the like of each switching element of the driver circuit 18. The expression (4) is related to the condition that should be met by the phase electric current command value Ix** under restriction of such upper limit.

The phase electric current command value Ix after the guarding procedure is applied in the guarding section 33 is input to the subtractor 34 together with the phase electric current value Ix of the control phase output from the control phase selecting section 32. The subtractor 34** obtains a phase electric current deviation ΔIx by subtracting the phase electric current value Ix from the phase electric current command value Ix*. The subtractor 34 then outputs the obtained phase electric current deviation ΔIx to a feedback control section 35. The feedback control section 35 calculates the phase voltage command value Vx* (=Vu*, Vv*, or Vw*) for the control phase by multiplying the phase electric current deviation ΔIx by a predetermined feedback gain (a PI gain).

The phase voltage command value Vx*, which is obtained by the feedback control section 35, is input to a phase voltage command value calculating section 36. The phase voltage command value calculating section 36 calculates the phase voltage command values Vu, Vv, Vw** based on the phase voltage command value Vx*.

An electric current cannot flow through the phase in which the failure of electric current flow has occurred. The two phases other than the phase with the failed electric current flow are offset by π/2 (180°) in the two phase drive mode. Thus, the phase voltage command value of the phase with the failed electric current flow is zero. The phase voltage command value of the functioning phase other than the functioning phase selected as the control phase is obtained by reversing the sign of the phase voltage command value of the phase selected as the control phase. The second control section 24b then sends the thus obtained phase voltage command values (Vu, Vv, Vw) to a switching control section 29**.

The switching control section 29 receives the anomaly detection signal S_tm, which is provided by the anomaly detecting section 31. If the anomaly detection signal S_tm of the anomaly detecting section 31 corresponds to the two phase drive mode, the switching control section 29 outputs the phase voltage command values Vu, Vv, Vw provided by the second control section 24b**, instead of the phase voltage command values Vu*, Vv*, Vw* provided by the first control section 24a, to the PWM converting section 30. The PWM converting section 30 thus produces the motor control signal having an ON duty ratio corresponding to the phase voltage command values Vu, Vv, Vw. The motor control signal is then output to the driver circuit 18**.

A procedure for switching the control modes and a procedure for generating the motor control signal in the two phase drive mode, which are carried out by the microcomputer 17, will hereafter be explained.

Figure 10:
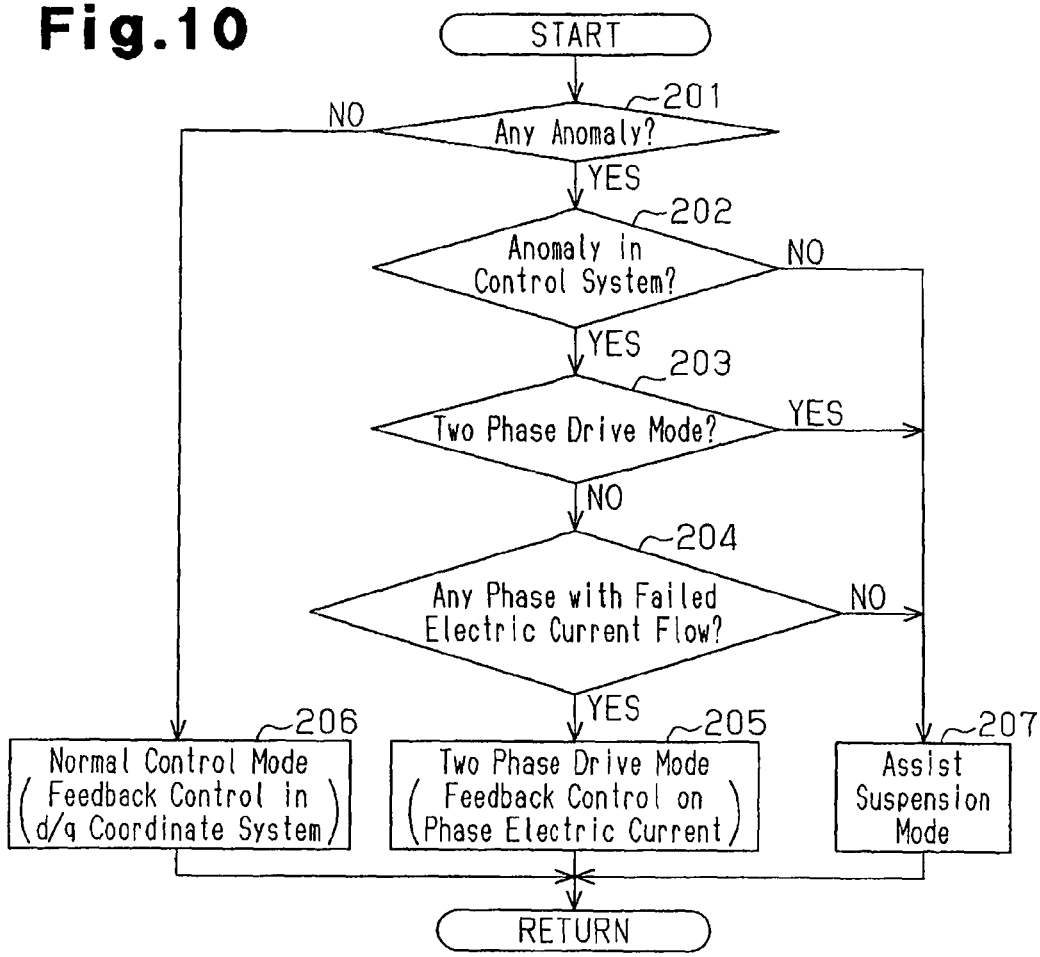
FIG. 10 is a flowchart representing a procedure for switching control modes of the EPS of FIG. 1.

As illustrated in FIG. 10, the microcomputer 17 first determines whether any anomaly has occurred in step 201. If it is determined that an anomaly has occurred (step 201: YES), the microcomputer 17 determines whether the anomaly has occurred in the control system in the subsequent step 202. If it is determined that an anomaly has occurred in the control system (step 202: YES), the microcomputer 17 determines whether the control mode is the two phase drive mode in the subsequent step 203. If it is determined that the control mode is not the two phase drive mode (step 203: NO), the microcomputer 17 determines whether the anomaly of the control system is generation of a failed electric current flow phase, that is, generation of a failed electric current flow in any phase of the motor 12, in the subsequent step 204. If it is determined that the anomaly of the control system is the generation of a failed electric current flow phase (step 204: YES), the microcomputer 17 selects the two phase drive mode as the control mode in step 205. As a result, the motor control signal for energizing the two phases other than the phase with the failed electric current flow is generated and output.

As has been described, to generate the motor control signal in the two phase drive mode, the phase electric current command values are calculated that change in accordance with the secant or cosecant curve with the asymptotic lines at the specific rotation angles θA, θB corresponding to the phase with the failed electric current flow. With reference to the phase electric current command values, the feedback control is carried out on the phase electric currents.

Figure 11:
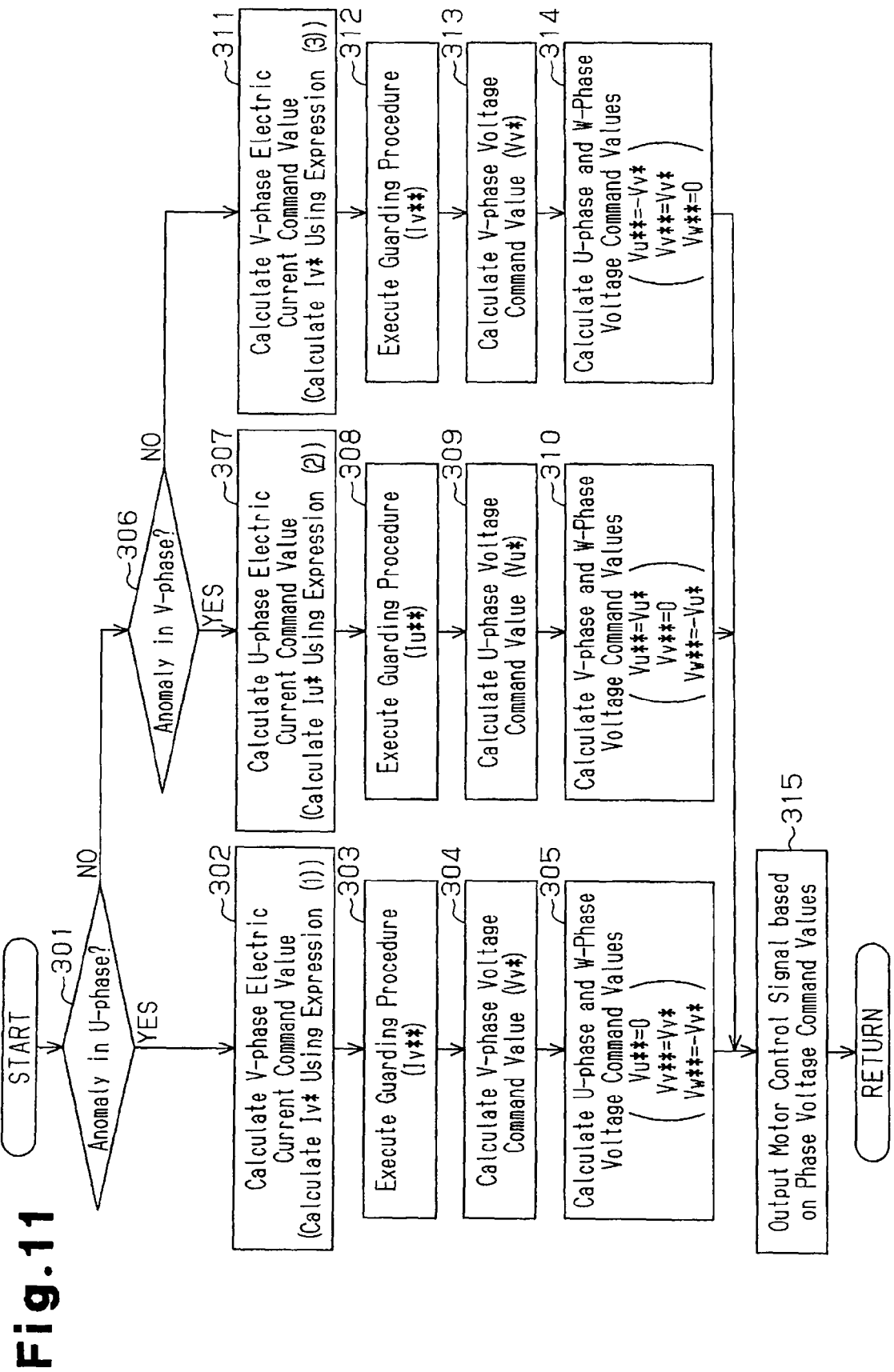
FIG. 11 is a flowchart representing a procedure for generating a motor control signal in the two phase drive mode of the EPS of FIG. 1.

Specifically, with reference to FIG. 11, the microcomputer 17 first determines whether the failure of electric current flow has occurred in the U-phase in step 301. If it is determined that the failed electric current has occurred in the U-phase (step 301: YES), the microcomputer 17 calculates the phase electric current command value Iv* of the V-phase using the above-listed expression (1) in step 302. In the subsequent step 303, the microcomputer 17 executes the guarding procedure with respect to the phase electric current command value Iv* and outputs the phase electric current command value Iv which is limited within the predetermined range. Then, in step 304, the microcomputer 17 feedback controls the V-phase electric current in accordance with the phase electric current command value Iv to obtain the phase voltage command value Vv* of the V-phase. In the subsequent step 305, the microcomputer 17 determines the phase voltage command values Vu, Vv, Vw** based on the phase voltage command value Vv* (Vu=0, Vv=Vv*, VW**=−Vv*).

If it is determined that the failure of electric current flow has not occurred in the U-phase in step 301 (step 301: NO), the microcomputer 17 determines whether the failure of electric current flow has occurred in the V-phase in step 306. If it is determined that the failed electric current flow has occurred in the V-phase (step 306: YES), the microcomputer 17 calculates the phase electric current command value Iu* of the U-phase using the above-listed expression (2) in the subsequent step 307. In the subsequent step 308, the microcomputer 17 executes the guarding procedure with respect to the phase electric current command value Iu* and outputs the phase electric current command value Iu which is limited within the predetermined range. Then, in step 309, the microcomputer 17 feedback controls the U-phase electric current in accordance with the phase electric current command value Iu to obtain the phase voltage command value Vu* of the U-phase. In the subsequent step 310, the microcomputer 17 determines the phase voltage command values Vu, Vv, Vw** based on the phase voltage command value Vu* (Vu**=Vu*, Vv=0, Vw=−Vu*).

If it is determined that the failure of electric current flow has not occurred in the V-phase in step 306 (step 306: NO), the microcomputer 17 calculates the phase electric current command value Iv* of the V-phase using the above-listed expression (3) in step 311. In the subsequent step 312, the microcomputer 17 executes the guarding procedure with respect to the phase electric current command value Iv* and outputs the phase electric current command value Iv which is limited within the predetermined range. Then, in step 313, the microcomputer 17 feedback controls the V-phase electric current in accordance with the phase electric current command value Iv to obtain the phase voltage command value Vv* of the V-phase. In the subsequent step 314, the microcomputer 17 determines the phase voltage command values Vu, Vv, VW based on the phase voltage command value Vv (Vu**=−Vv*, Vv**=Vv*, VW**=0).

Then, in step 315, the microcomputer 17 generates the motor control signal in correspondence with the phase voltage command values Vu, Vv, VW** obtained in step 305, 310, or 314 and outputs the motor control signal to the driver circuit 18.

If it is determined that there is no anomaly in step 201 (step 201: NO), the microcomputer 17 selects the normal control mode as the control mode in step 206. As a result, as has been described, the feedback control is carried out on the electric currents in the d/q coordinate system so as to generate and output the motor control signal. If it is determined that the anomaly has not occurred in the control system in step 202 (step 202: NO), or if it is determined that the control mode is the two phase drive mode in step 203 (step 203: YES), or if it is determined that the anomaly of the control system is not the generation of a failed electric current flow phase in step 204 (step 204: NO), the microcomputer 17 selects the assist suspension mode as the control mode in step 207. As a result, the motor control signal is produced and output in such a manner as to stop operation of the motor 12 and to open the power source relay.

[Anomaly Detection of Control System]

Next, a description will be given of a manner in which an anomaly of the control system is detected in the present embodiment.

As described above, at a time of generating the motor control signal in the two phase drive mode, the phase electric current command value changing in accordance with a secant curve or a cosecant curve with the asymptotic lines at predetermined rotation angles θA and θB corresponding to the phase in which a failed electric current flow has occurred, and the phase electric current feedback control is executed on the basis of the phase electric current command value (refer to FIGS. 4 to 6). Accordingly, in theory, the motor electric current (the q-axis electric current Iq) matching the required torque (the q-axis electric current command value Iq*) is generated except the rotation angles θA and θB (refer to FIGS. 7 to 9). As a result, the generation of a torque ripple is suppressed, and it is possible to continue applying the assist force to the steering system while maintaining satisfactory steering comfort. The anomaly detecting section 31 detects the generation of an anomaly in the control system on the basis of the comparison between the q-axis electric current deviation ΔIq and a predetermined threshold value I1. Since the motor electric current (the q-axis electric current value Iq) matching the required torque (the q-axis electric current command value Iq*) is generated as described above, an anomaly of the control system is theoretically expected to be detected at a time of the two phase drive mode.

Figure 7:
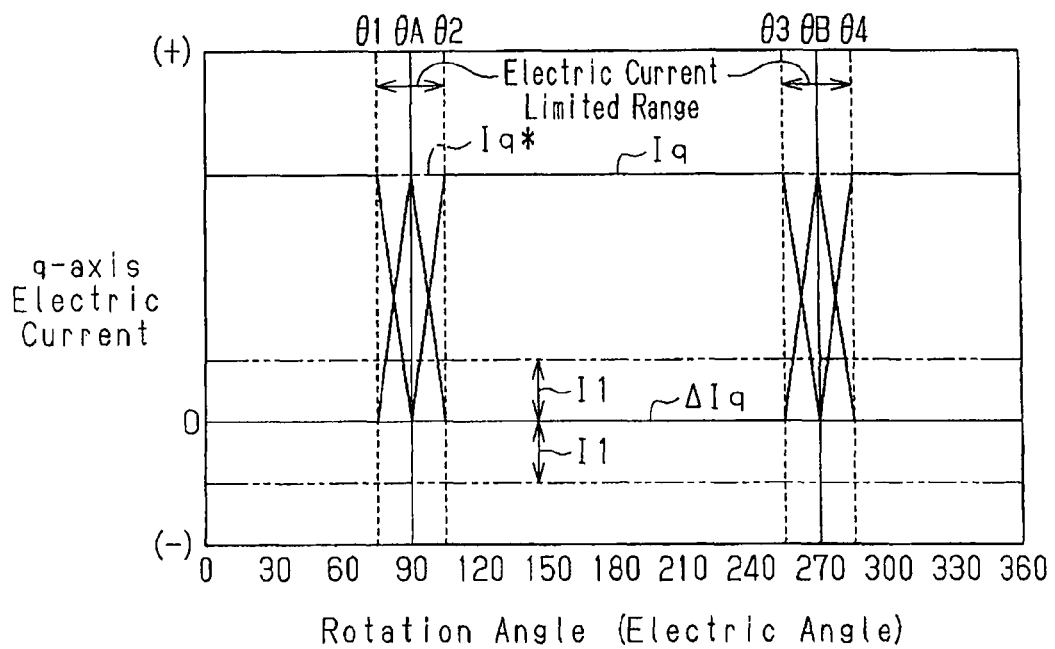
FIG. 7 is a graph showing a change of a q-axis electric current at a time of the two phase drive mode of the EPS of FIG. 1 in the case that a failure of electric current flow has occurred in the U-phase.
Figure 8:
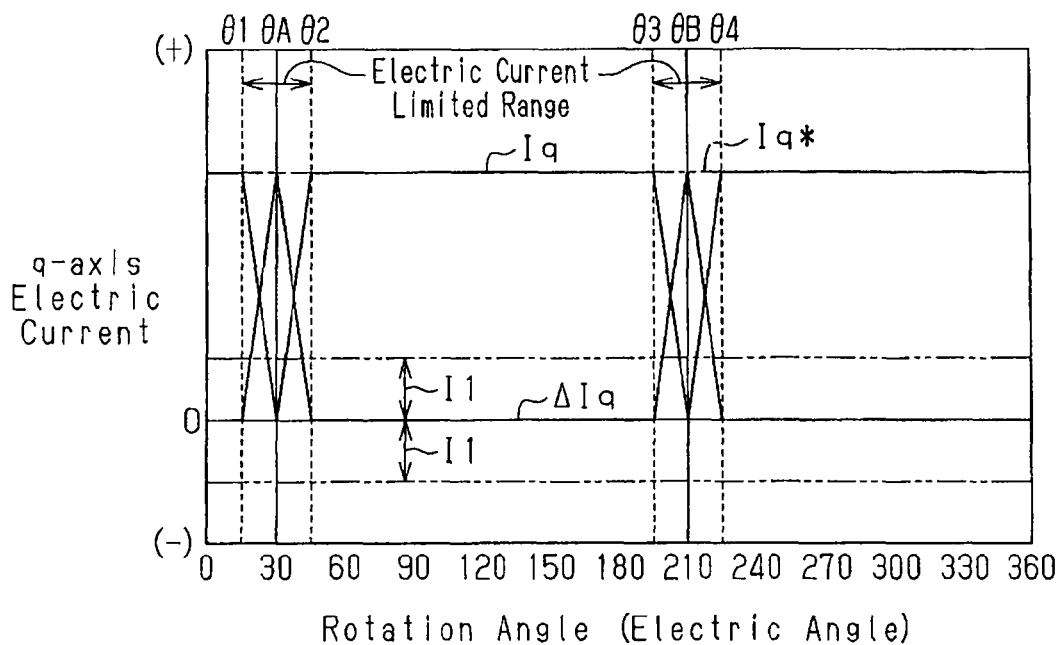
FIG. 8 is a graph showing a change of a q-axis electric current at a time of the two phase drive mode of the EPS of FIG. 1 in the case that a failure of electric current flow has occurred in the V-phase.
Figure 9:
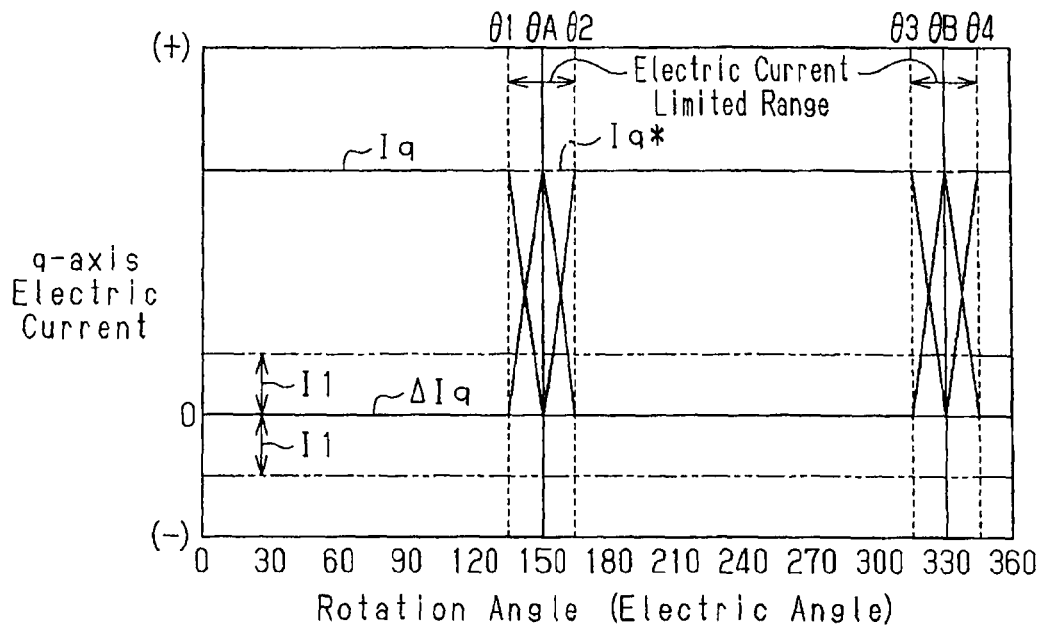
FIG. 9 is a graph showing a change of a q-axis electric current at a time of the two phase drive mode of the EPS of FIG. 1 in the case that a failure of electric current flow has occurred in the W-phase.

However, since the motor coils 12u, 12v and 12w of the respective phases have the upper limits of (the absolute value of) the applicable electric current, the electric current command value of each of the phases calculated at a time of the two phase drive mode is subjected to the guarding procedure for limiting the value within the predetermined range (refer to FIGS. 4 to 6). Accordingly, as shown in FIGS. 7 to 9, the q-axis electric current deviation ΔIq is generated regardless of whether there is an anomaly in the control system near the rotation angles θA and θB (the range from θ1 to θ2 and the range from θ3 to θ4), whereby there is a possibility that an anomaly of the control system is erroneously detected. Taking this point into consideration, in accordance with the present embodiment, the anomaly detecting section 31 does not execute the anomaly detection of the control system utilizing the q-axis electric current deviation ΔIq (inhibits the anomaly detection of the control system) at a time when a failure of electric current flow has occurred in any phase of the motor 12, that is, at a time of the two phase drive mode. The phase electric current command value Ix* is limited in the range of the rotation angle θ at which the absolute value comes to the maximum value Ix_max of the applicable electric current or higher (Ix*≧Ix_max, Ix*≦−Ix_max). Accordingly, it is possible to specify the range of the rotation angle θ at which the phase electric current command value Ix* is limited, by substituting the upper limit value +Ix_max and the lower limit value −Ix_max for each of the expressions (1) to (3) mentioned above, and solving the expressions (1) to (3) for the rotation angle θ.

Specifically, in the case that a failure of electric current flow has occurred in the U phase, the rotation angles θ1 and θ2 defining the limiting range including the rotation angle θA corresponding to one of two asymptotic lines are determined by solving the following expressions (5), (6), (7) and (8) obtained by substituting the upper limit value +Ix_max and the lower limit value −Ix_max for the expression (1) mentioned above.

When $Iq* \geq 0$: (5)

$$I_v = \frac{I_q^*}{\sqrt{2} \cos\theta_1} = I_{x\_max} \quad \therefore \theta_1 = \cos^{-1}\left(\frac{I_q^*}{\sqrt{2}\, I_{x\_max}}\right)$$

$$I_v = \frac{I_q^*}{\sqrt{2} \cos\theta_2} = -I_{x\_max} \quad \therefore \theta_2 = \cos^{-1}\left(\frac{-I_q^*}{\sqrt{2}\, I_{x\_max}}\right) \quad (6)$$

When $Iq* < 0$: (7)

$$I_v = \frac{I_q^*}{\sqrt{2} \cos\theta_1} = -I_{x\_max} \quad \therefore \theta_1 = \cos^{-1}\left(\frac{-I_q^*}{\sqrt{2}\, I_{x\_max}}\right)$$

$$I_v = \frac{I_q^*}{\sqrt{2} \cos\theta_2} = I_{x\_max} \quad \therefore \theta_2 = \cos^{-1}\left(\frac{I_q^*}{\sqrt{2}\, I_{x\_max}}\right) \quad (8)$$

The rotation angles θ1 and θ2, which are the solutions of the expressions (5) to (8), are each expressed by an arccosine, which is an inverse function of a cosine. Accordingly, since the expressions cos(−θ)=cos θ and cos(θ+2n)=cos θ are established, the rotation angles θ3 and θ4 defining the limiting range including the rotation angle δB which is shifted by 2n in phase from the rotation angle θA is determined in accordance with the following expressions (9) and (10).

$$\theta_3 = 2\pi - \theta_2 \quad (9)$$

$$\theta_4 = 2\pi - \theta_1 \quad (10)$$

In the case that a failure of electric current flow has occurred in the V phase, the rotation angles θ1 and θ2 defining the limiting range including the rotation angle θA is determined by solving the following expressions (11), (12), (13) and (14) obtained by substituting the upper limit value +Ix_max and the lower limit value −Ix_max for the expression (2) mentioned above.

When $Iq* \geq 0$: (11)

$$I_u = \frac{-I_q^*}{\sqrt{2} \sin\left(\theta_1 + \frac{\pi}{6}\right)} = I_{x\_max} \quad \therefore \theta_1 = \sin^{-1}\left(\frac{-I_q^*}{\sqrt{2}\, I_{x\_max}}\right) + \frac{\pi}{6}$$

$$I_u = \frac{-I_q^*}{\sqrt{2} \sin\left(\theta_2 - \frac{\pi}{6}\right)} = -I_{x\_max} \quad \therefore \theta_2 = \sin^{-1}\left(\frac{I_q^*}{\sqrt{2}\, I_{x\_max}}\right) + \frac{\pi}{6} \quad (12)$$

When $Iq* < 0$: (13)

$$I_u = \frac{-I_q^*}{\sqrt{2} \sin\left(\theta_1 - \frac{\pi}{6}\right)} = -I_{x\_max} \quad \therefore \theta_1 = \sin^{-1}\left(\frac{I_q^*}{\sqrt{2}\, I_{x\_max}}\right) + \frac{\pi}{6}$$

$$I_u = \frac{-I_q^*}{\sqrt{2} \sin\left(\theta_2 - \frac{\pi}{6}\right)} = I_{x\_max} \quad \therefore \theta_2 = \sin^{-1}\left(\frac{-I_q^*}{\sqrt{2}\, I_{x\_max}}\right) + \frac{\pi}{6} \quad (14)$$

The rotation angles θ1 and θ2, which are the solutions of the expressions (11) to (14), are each expressed by an arcsine, which is an inverse function of a sine. Accordingly, since the expressions sin(n−θ)=sin θ are established, the following expressions (15) and (16) are established between the rotation angles θ1 and θ2 defining the limiting range including the rotation angle θA and the rotation angles θ3 and θ4 defining the limiting range including the rotation angle θB. The rotation angles θ3 and θ4 are determined by solving the expressions (15) and (16).

$$\pi - \left(\theta_2 - \frac{\pi}{6}\right) = \theta_3 - \frac{\pi}{6} \quad \therefore \theta_3 = \frac{4\pi}{3} - \theta_2 \quad (15)$$

$$\pi - \left(\theta_1 - \frac{\pi}{6}\right) = \theta_4 - \frac{\pi}{6} \quad \therefore \theta_4 = \frac{4\pi}{3} - \theta_1 \quad (16)$$

In the case that a failure of electric current flow has occurred in the W phase, the rotation angles θ3 and θ4 defining the limiting range including the rotation angle θB is determined by solving the following expressions (17), (18), (19) and (20) obtained by substituting the upper limit value +Ix_max and the lower limit value −Ix_max for the expression (3) mentioned above.

When $Iq^* \geq 0$:

$$I_v = \frac{I_q^*}{\sqrt{2} \sin\left(\theta_4 + \frac{\pi}{6}\right)} = I_{x\_max} \quad \therefore \theta_4 = \sin^{-1}\left(\frac{I_q^*}{\sqrt{2}\, I_{x\_max}}\right) - \frac{\pi}{6} \quad (17)$$

$$I_v = \frac{I_q^*}{\sqrt{2} \sin\left(\theta_3 + \frac{\pi}{6}\right)} = -I_{x\_max} \quad \therefore \theta_3 = \sin^{-1}\left(\frac{-I_q^*}{\sqrt{2}\, I_{x\_max}}\right) - \frac{\pi}{6} \quad (18)$$

When $Iq^* < 0$:

$$I_v = \frac{I_q^*}{\sqrt{2} \sin\left(\theta_4 + \frac{\pi}{6}\right)} = -I_{x\_max} \quad \therefore \theta_4 = \sin^{-1}\left(\frac{-I_q^*}{\sqrt{2}\, I_{x\_max}}\right) - \frac{\pi}{6} \quad (19)$$

$$I_v = \frac{I_q^*}{\sqrt{2} \sin\left(\theta_3 + \frac{\pi}{6}\right)} = I_{x\_max} \quad \therefore \theta_3 = \sin^{-1}\left(\frac{I_q^*}{\sqrt{2}\, I_{x\_max}}\right) - \frac{\pi}{6} \quad (20)$$

The rotation angles θ3 and θ4, which are the solutions of the expressions (17) to (20), are each expressed by an arcsine, which is an inverse function of a sine. Accordingly, since the expression sin(π−θ)=sin θ is established, the following expressions (21) and (22) are established between the rotation angles θ3 and θ4 defining the limiting range including the rotation angle θB and the rotation angles θ1 and θ2 defining the limiting range including the rotation angle θA. The rotation angles θ1 and θ2 are determined by solving the expressions (21) and (22).

$$\pi - \left(\theta_3 + \frac{\pi}{6}\right) = \theta_2 + \frac{\pi}{6} \qquad \therefore \theta_2 = \frac{2\pi}{3} - \theta_3 \quad (21)$$

$$\pi - \left(\theta_4 + \frac{\pi}{6}\right) = \theta_1 + \frac{\pi}{6} \qquad \therefore \theta_1 = \frac{2\pi}{3} - \theta_4 \quad (22)$$

As described above, the anomaly detecting section 31 calculates the rotation angles θ1 and θ2 defining the limiting range including the rotation angle θA corresponding to one of two asymptotic lines and the rotation angles θ3 and θ4 defining the limiting range including the rotation angle θB corresponding to the other asymptotic line. Further, the anomaly detecting section 31 does not execute the anomaly detection of the control system in the case that the detected rotation angle θ of the motor 12 exists within any of the limiting ranges (in the case of θ1<θ<θ2 or θ3<θ<θ4). Accordingly, it is possible to prevent an anomaly of the control system from being erroneously detected, and it is possible to improve the precision for detecting an anomaly of the control system at a time of the two phase drive mode.

Figure 12:
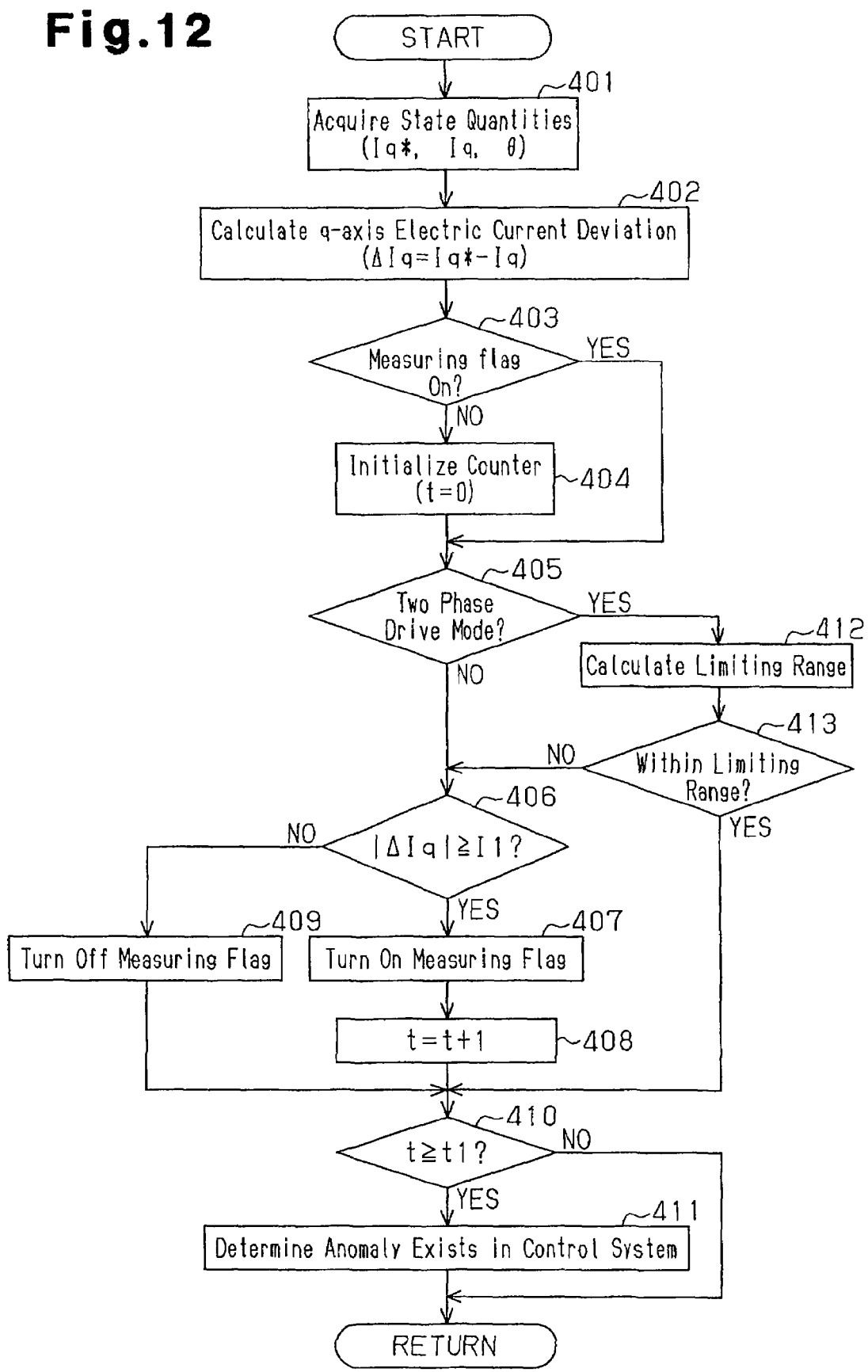
FIG. 12 is a flowchart representing a routine for detecting an anomaly in a control system carried out by the EPS of FIG. 1.

Describing in more detail, as shown in FIG. 12, if the anomaly detecting section 31 acquires the q-axis electric current command value Iq*, the q-axis electric current value Iq, and the rotation angle θ as the state quantity used for detecting the anomaly of the control system in step 401, the anomaly detecting section 31 first calculates the q-axis electric current deviation ΔIq in step 402 (ΔIq=Iq*−Iq). Next, the anomaly detecting section 31 determines whether a measuring flag is on in step 403. In the case that it is determined that the measuring flag is not on but is off (step 403: NO), the anomaly detecting section 31 initializes an elapsed time measuring counter, that is, sets a counter value t to zero in step 404 (t=0). In the case that it is determined that the measuring flag is on in step 403 (step 403: YES), the anomaly detecting section 31 does not execute the initialization of the counter in step 404.

Next, the anomaly detecting section 31 determines whether the control mode is the two phase drive mode in step 405. In the case of determining that the control mode is not the two phase drive mode (step 405: NO), that is, in the case of determining that the control mode is the normal control mode, the anomaly detecting section 31 determines whether (the absolute value of) the q-axis electric current deviation ΔIq is equal to or more than the threshold value I1 in step 406. In the case that it is determined that (the absolute value of) the q-axis electric current deviation ΔIq is equal to or more than the threshold value I1 (|ΔIq|≧I1, step 406: YES), the anomaly detecting section 31 turns on the measuring flag in step 407, and increments the counter value t by one in step 408 (t=t+1). In the case that it is determined that (the absolute value of) the q-axis electric current deviation ΔIq is less than the threshold value I1 in step 406 (|ΔIq|<I1, step 406: NO), the anomaly detecting section 31 turns off the measuring flag in step 409.

Next, the anomaly detecting section 31 determines whether the counter value t is equal to or more than a threshold value t1 in step 410. In the case that it is determined that the counter value t is equal to or more than the threshold value t1 (step 410: YES), the anomaly detecting section 31 determines that an anomaly has occurred in the control system in step 411.

In other words, in the case that the anomaly detecting section 31 determines that (the absolute value of) the q-axis electric current deviation ΔIq is equal to or more than the threshold value I1, the anomaly detecting section 31 turns on the measuring flag, and starts counting the duration. Further, in the case that the state in which (the absolute value of) the q-axis electric current deviation ΔIq is equal to or more than the threshold value I1 continues for a predetermined time or more, it is determined that there is an anomaly in the control system.

On the other hand, in the case that it is determined that the control mode is the two phase drive mode in step 405 (step 405: YES), the anomaly detecting section 31 calculates the rotation angles θ1 and θ2 defining the limiting range including the rotation angle θA corresponding to one of two asymptotic lines and the rotation angles θ3 and θ4 defining the limiting range including the rotation angle θB corresponding to the other asymptotic line in accordance with the expressions (5) to (22), in step 412. The anomaly detecting section 31 determines whether the rotation angle θ acquired in the previous step 401 exists within any of the limiting ranges in step 413. In the case that it is determined that the rotation angle θ is deviated from any of the limiting ranges (0<θ≦θ1, θ2≦θ≦θ3 or θ4≦θ≦2n, step 413: NO), the anomaly detecting section 31 executes the processes after step 406. In the case that it is determined that the rotation angle θ exists within any of the limiting ranges (θ1<θ≦θ2 or θ3<θ<θ4, step 413: YES), the anomaly detecting section 31 executes the processes after step 410 without executing the processes in step 406 to step 409.

The first embodiment has the following advantages.

The microcomputer 17 basically detects the anomaly of the control system by comparing the q-axis electric current deviation ΔIq with the threshold value I1. The microcomputer 17 is provided with the anomaly detecting section 31 detecting the failed electric current flow in the case that a failure of electric current flow has occurred in any phase of the motor 12. In the case that a failure of electric current flow has occurred in any phase of the motor 12, the phase electric current command value changing in accordance with a secant curve or a cosecant curve with asymptotic lines at the predetermined rotation angles θA and θB is calculated with regard to the other two phases than the phase in which the failure of electric current flow has occurred. The phase electric current feedback control is executed on the basis of the obtained phase electric current command value, whereby the motor control signal is generated. At a time of the phase electric current feedback control, the phase electric current command value is limited within the predetermined range. In the case that a failure of electric current flow has occurred in any phase of the motor 12, the microcomputer 17 does not carry out the process for detecting an anomaly of the control system if the rotation angle θ exists within the range (the limiting range) in which the phase electric current command value is limited.

In accordance with the structure described above, the motor electric current (the q-axis electric current value Iq) matching the required torque (the q-axis electric current command value Iq*) is generated except the limiting range (θ1<θ<θ2 and θ3<θ<θ4) respectively including the rotation angles θA and θB corresponding to the asymptotic line. As a result, even in the case that a failure of electric current flow has occurred in any phase of the motor 12, the generation of the torque ripple is suppressed, and it is possible to continuously apply the assist force to the steering system while maintaining satisfactory steering comfort. Further, in the limiting range in which the q-axis electric current deviation ΔIq is generated regardless of whether there is an anomaly in the control system, the anomaly detection of the control system utilizing the q-axis electric current deviation ΔIq is not carried out. Accordingly, the erroneous detection of the anomaly of the control system is prevented, and it is possible to improve the detection accuracy of anomaly of the control system at a time of the two phase drive mode.

Second Embodiment

A description will be given below of a second embodiment in accordance with the present invention with reference to FIGS. 13 to 19. A main different point of the second embodiment from the first embodiment described above exists in a manner in which an anomaly of the control system is detected. In the following description, the same reference numerals are attached to the same portions as those of the first embodiment, and a description thereof will be omitted.

Figure 13:
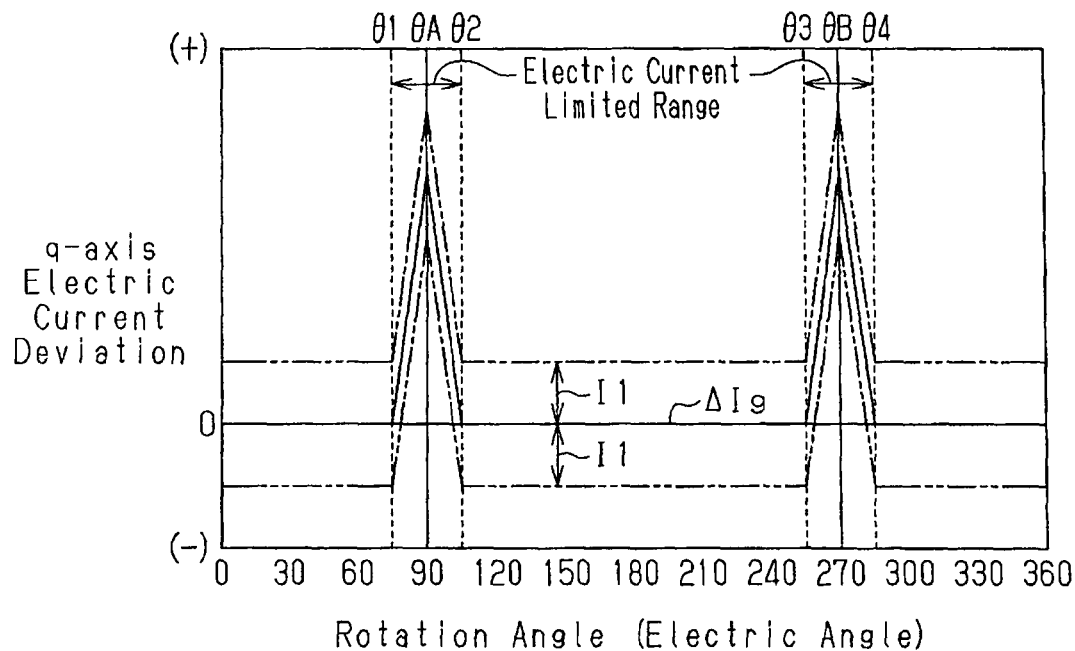
FIG. 13 is a graph showing a change of a q-axis electric current deviation at a time of a two phase drive mode of an EPS in accordance with a second embodiment of the present invention in the case that a failure of electric current flow has occurred in a U-phase.
Figure 14:
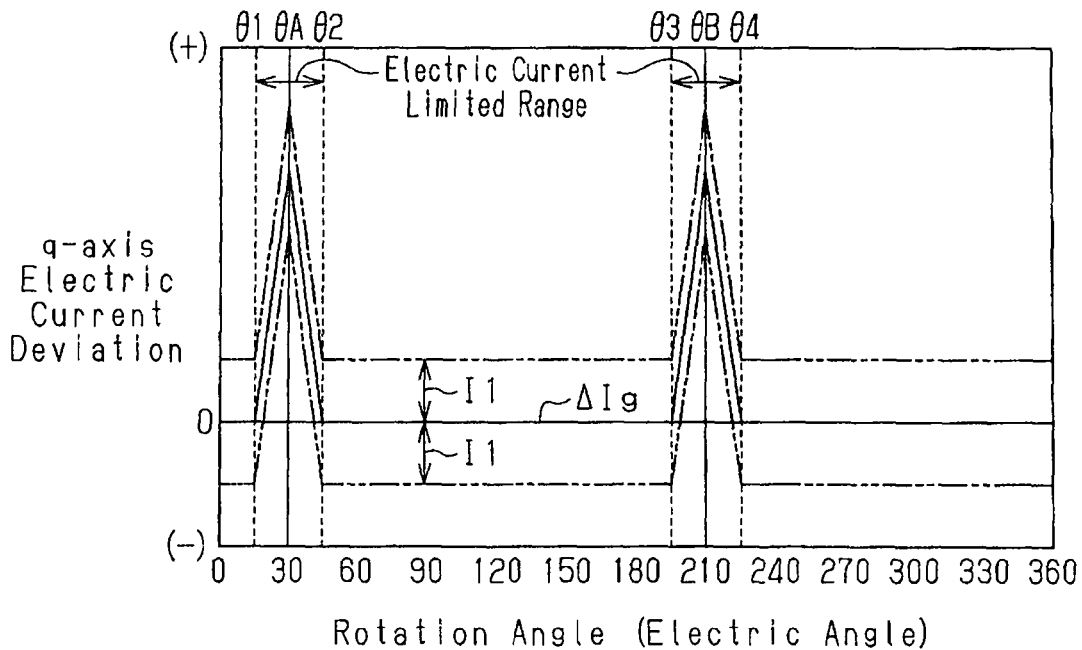
FIG. 14 is a graph showing a change of a q-axis electric current deviation at a time of a two phase drive mode of the EPS in accordance with the second embodiment in the case that a failure of electric current flow has occurred in a V-phase.
Figure 15:
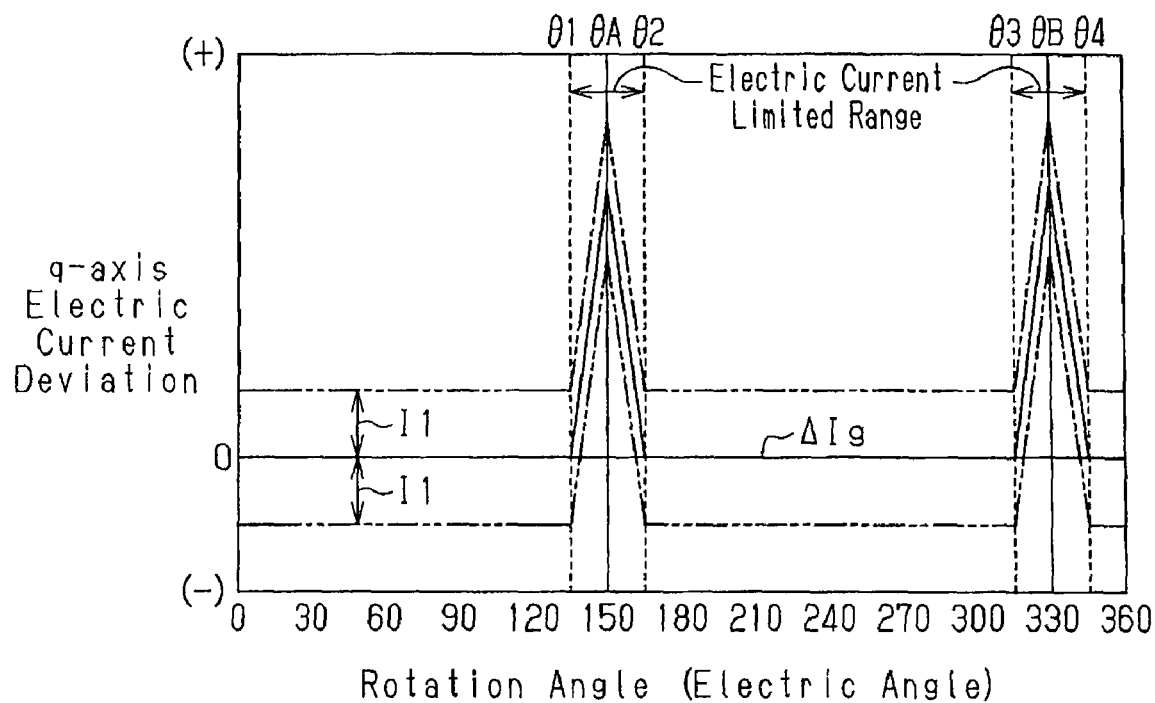
FIG. 15 is a graph showing a change of a q-axis electric current deviation at a time of a two phase drive mode of the EPS in accordance with the second embodiment in the case that a failure of electric current flow has occurred in a W-phase.

In the second embodiment, in the case that the detected rotation angle θ of the motor 12 exists within any of the limiting ranges (in the case of θ1<θ<θ2 or θ3<θ<θ4) at a time when a failure of electric current flow has occurred in any phase of the motor 12, the anomaly detecting section 31 changes the threshold value used in the anomaly detection of the control system utilizing the q-axis electric current deviation ΔIq in such a manner as to correspond to a fluctuation of the q-axis electric current deviation ΔIq generated by the phase electric current command value Ix* being limited (refer to FIGS. 13 to 15).

Describing in detail, in the case that the detected rotation angle θ exists within any of the limiting ranges at a time when a failure of electric current flow has occurred in any phase of the motor 12, the anomaly detecting section 31 calculates a correction term β corresponding to the fluctuation of the q-axis electric current deviation ΔIq generated by the phase electric current command value Ix* being limited. Specifically, the anomaly detecting section 31 calculates the correction term β by solving any of the following expressions (23) to (34) in correspondence to the phase in which the failure of electric current flow has occurred, and in correspondence to the sign of the q-axis electric current command value Iq*, and changes the threshold value for detecting the anomaly of the control system utilizing the q-axis electric current deviation ΔIq by using the correction term β.

In the case that a failure of electric current flow has occurred in the U phase, and θ1<θ<π/2 or 3π/2<θ<θ4:

$$\beta = I_q^* - \sqrt{2} I_{x\_max} \cos\theta \, (I_q^* \geq 0) \quad (23)$$

$$\beta = I_q^* + \sqrt{2} I_{x\_max} \cos\theta \, (I_q^* < 0) \quad (24)$$

In the case that a failure of electric current flow has occurred in the U phase, and π/2<θ<θ2 or θ3<θ<3π/2:

$$\beta = I_q^* + \sqrt{2} I_{x\_max} \cos\theta \, (I_q^* \geq 0) \quad (25)$$

$$\beta = I_q^* - \sqrt{2} I_{x\_max} \cos\theta \, (I_q^* < 0) \quad (26)$$

In the case that a failure of electric current flow has occurred in the V phase, and θ1<θ<π/6 or 7π/6<θ<θ4:

$$\beta = I_q^* - I_{x\_max}\left(-\sqrt{\frac{3}{2}}\sin\theta + \sqrt{\frac{1}{2}}\cos\theta\right)(I_q^* \geq 0) \quad (27)$$

$$\beta = I_q^* + I_{x\_max}\left(-\sqrt{\frac{3}{2}}\sin\theta + \sqrt{\frac{1}{2}}\cos\theta\right)(I_q^* < 0) \quad (28)$$

In the case that a failure of electric current flow has occurred in the V phase, and π/6<θ<θ2 or θ3<θ<7π/6:

$$\beta = I_q^* + I_{x\_max}\left(-\sqrt{\frac{3}{2}}\sin\theta + \sqrt{\frac{1}{2}}\cos\theta\right)(I_q^* \geq 0) \quad (29)$$

$$\beta = I_q^* - I_{x\_max}\left(-\sqrt{\frac{3}{2}}\sin\theta + \sqrt{\frac{1}{2}}\cos\theta\right)(I_q^* < 0) \quad (30)$$

In the case that a failure of electric current flow has occurred in the W phase, and θ1<θ<5π/6 or 11π/6<θ<θ4:

$$\beta = I_q^* - I_{x\_max}\left(\sqrt{\frac{3}{2}}\sin\theta + \sqrt{\frac{1}{2}}\cos\theta\right)(I_q^* \geq 0) \quad (31)$$

$$\beta = I_q^* + I_{x\_max}\left(\sqrt{\frac{3}{2}}\sin\theta + \sqrt{\frac{1}{2}}\cos\theta\right)(I_q^* < 0) \quad (32)$$

In the case that a failure of electric current flow has occurred in the W phase, and 5π/6<θ<θ2 or θ3<θ<11π/6:

$$\beta = I_q^* + I_{x\_max}\left(\sqrt{\frac{3}{2}}\sin\theta + \sqrt{\frac{1}{2}}\cos\theta\right)(I_q^* \geq 0) \quad (33)$$

$$\beta = I_q^* - I_{x\_max}\left(\sqrt{\frac{3}{2}}\sin\theta + \sqrt{\frac{1}{2}}\cos\theta\right)(I_q^* < 0) \quad (34)$$

With respect to the rotation angles θ1 and θ2 defining the limiting range including the rotation angle θA, and the rotation angles θ3 and θ4 defining the limiting range including the rotation angle θB, refer to FIGS. 13 to 15 and the expressions (5) to (22) mentioned above.

The correction term β is added to the threshold values I1 or −I1 at the normal time. The detection accuracy of anomaly of the control system is improved by carrying out the anomaly detection of the control system on the basis of the threshold value after correction.

Next, a description will be given of a manner in which an anomaly of the control system is detected in the second embodiment.

In the following flowchart in FIG. 16, processes of steps 501 to 513 are the same as the processes of steps 401 to 413 in the flowchart in FIG. 12 mentioned above and illustrating the first embodiment. Accordingly, a description of steps 501 to 513 in FIG. 16 will be omitted.

Figure 16:
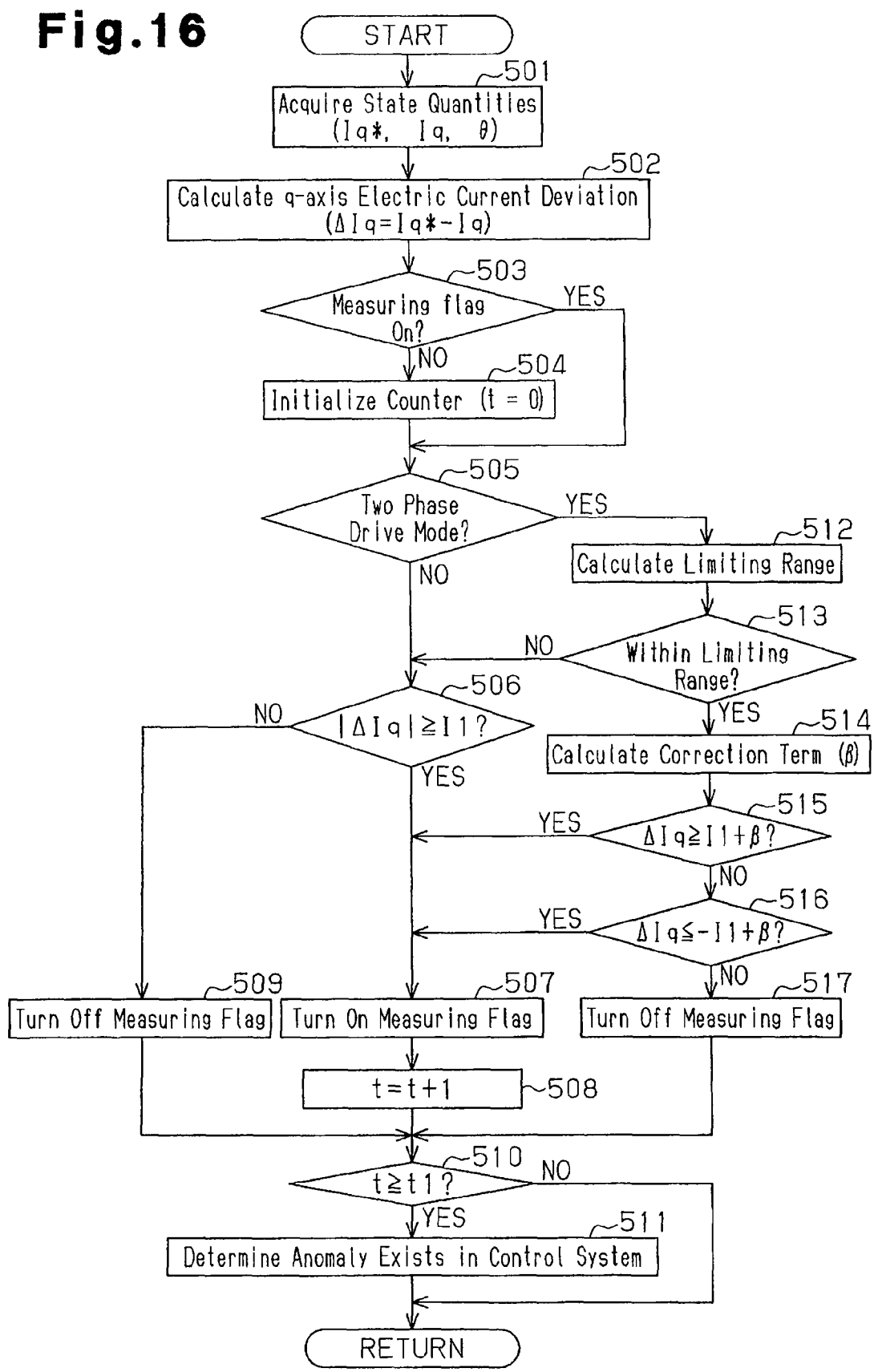
FIG. 16 is a flowchart representing a routine for detecting an anomaly in a control system carried out by the EPS in accordance with the second embodiment.

As shown in FIG. 16, in the case that it is determined that the control mode is the two phase drive mode (step 505: YES), and it is determined that the rotation angle θ exists within any of the limiting ranges calculated in step 512 (θ1<θ<θ2 or θ3<θ<θ4, step 513: YES), the anomaly detecting section 31 calculates the correction term β in accordance with any of the expressions (23) to (34) mentioned above in correspondence to the phase in which the failure of electric current flow has occurred, and in correspondence to the magnitude of the rotation angle θ, in step 514.

Next, the anomaly detecting section 31 determines whether the q-axis electric current deviation ΔIq is equal to or more than a value obtained by adding the correction term β to a value (+I1) obtained by setting the sign of the threshold value I1 to a positive value in step 515. In the case that it is determined that the q-axis electric current deviation ΔIq is smaller than the corrected threshold value (step 515: NO), the anomaly detecting section 31 determines whether the q-axis electric current deviation ΔIq is equal to or less than a value obtained by adding the correction term β to a value (−I1) obtained by setting the sign of the threshold value I1 to a negative value in step 516. In the case that it is determined that the q-axis electric current deviation ΔIq is equal to or more than the corrected threshold value (ΔIq≧I1+β, step 515: YES) in step 515, or in the case that it is determined that the q-axis electric current deviation ΔIq is equal to or less than the corrected threshold value (ΔIq≦−I1+β, step 516: YES) in step 516, the anomaly detecting section 31 executes the processes of steps 507 and 508. In other words, the measuring flag is turned on in step 507, and the counter value t is incremented by one in step 508 (t=t+1).

On the other hand, in the case that it is determined that the q-axis electric current deviation ΔIq is larger than the corrected threshold value in step 516 (ΔIq>−I1+β, step 516: NO), that is, in the case that it is determined that the q-axis electric current deviation ΔIq exists in a suitable range, the anomaly detecting section 31 turns off the measuring flag in step 517.

Thereafter, the anomaly detecting section 31 determines whether the counter value t is equal to or more than the threshold value t1 in step 510. In the case that it is determined that the counter value t is equal to or more than the threshold value t1 (step 510: YES), the anomaly detecting section 31 determines that there is an anomaly in the control system in step 511.

In accordance with the second embodiment described above, it is possible to avoid the erroneous detection of the anomaly of the control system at a time when the rotation angle θ exists within any of the limiting ranges (θ1<θ<θ2 or θ3<θ<θ4) near the rotation angles θA and θB. As a result, it is possible to improve the detection accuracy of anomaly of the control system.

Third Embodiment

A description will be given below of a third embodiment in accordance with the present invention with reference to FIGS. 20 to 23. A main different point of the third embodiment from the first embodiment described above exists in a manner in which an anomaly of the control system is detected. In the following description, the same reference numerals are attached to the same portions as those of the first embodiment, and a description thereof will be omitted.

In the third embodiment, when a failure of electric current flow has occurred in any phase of the motor 12, the anomaly detecting section 31 calculates a hypothetical d-axis electric current command value Id* which, if the feedback control in the d/q coordinate system is executed, can generate the phase electric current changing in accordance with a secant curve or a cosecant curve with asymptotic lines at the rotation angles θA and θB in the remaining two phases in the same manner as the phase electric current feedback control mentioned above. In other words, the anomaly detecting section 31 calculates the hypothetical d-axis electric current command value Id* corresponding to the phase electric current command value Ix* in accordance with the phase electric current feedback control at a time of the two phase drive mode. The anomaly detecting section 31 calculates the deviation between the d-axis electric current command value Id* and the actual d-axis electric current value Id, that is, the d-axis electric current deviation ΔId, and compares the d-axis electric current deviation ΔId with a predetermined threshold value I2, thereby carrying out the anomaly detection in the control system.

Figure 17:
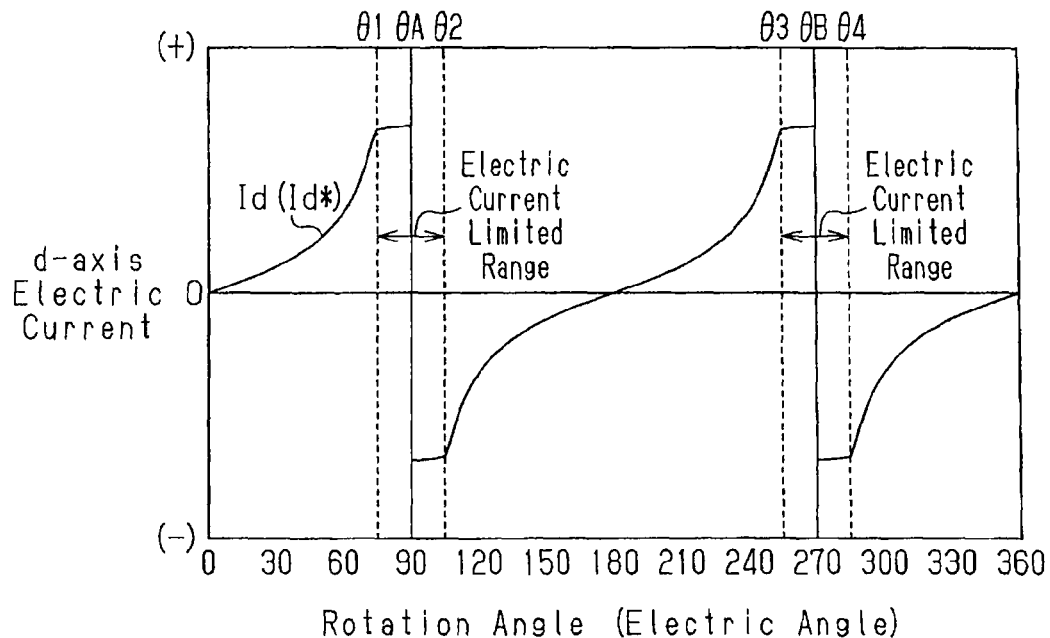
FIG. 17 is a graph showing a change of a d-axis electric current at a time of the two phase drive mode of the EPS in accordance with the second embodiment in the case that a failure of electric current flow has occurred in the U-phase.
Figure 18:
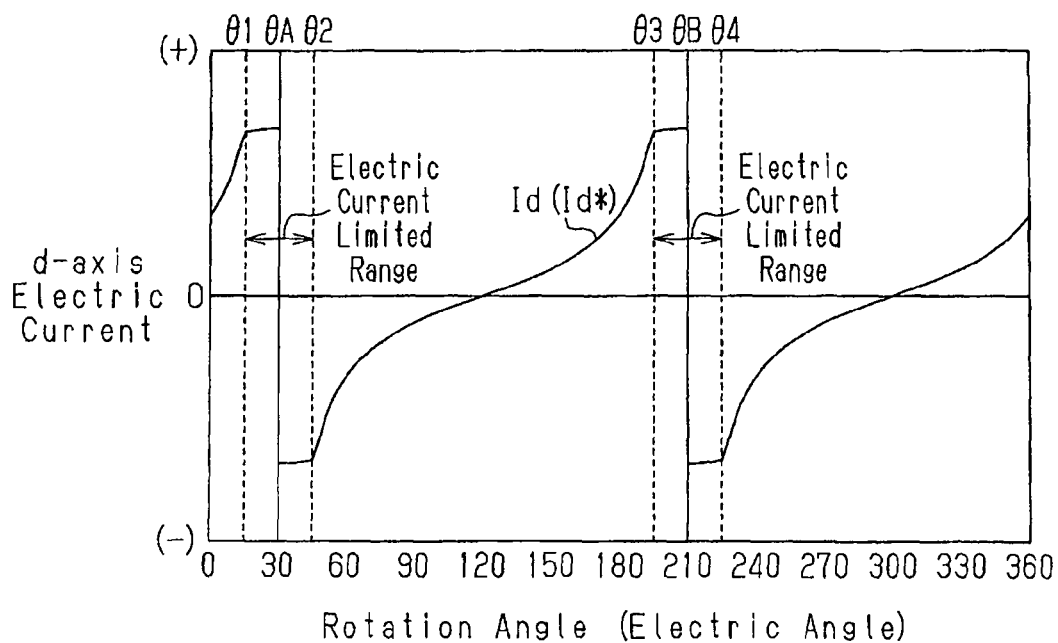
FIG. 18 is a graph showing a change of a d-axis electric current at a time of the two phase drive mode of the EPS in accordance with the second embodiment in the case that a failure of electric current flow has occurred in the V-phase.
Figure 19:
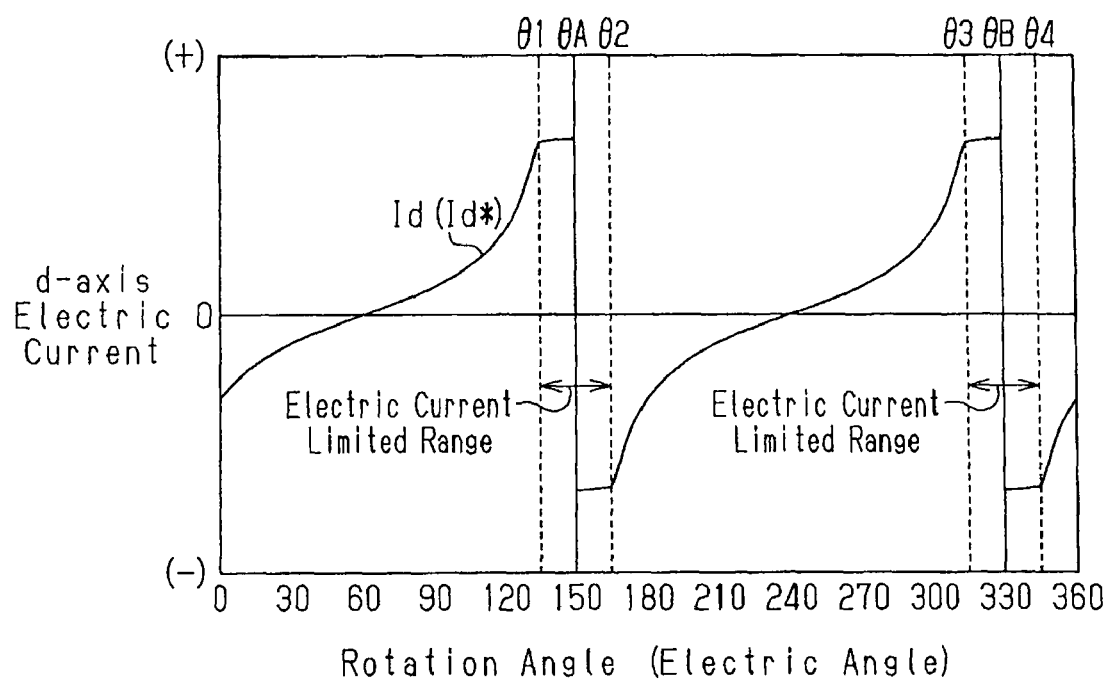
FIG. 19 is a graph showing a change of a d-axis electric current at a time of the two phase drive mode of the EPS in accordance with the second embodiment in the case that a failure of electric current flow has occurred in the W-phase.

In the case of circulating the phase electric current changing in accordance with a secant curve or a cosecant curve with asymptotic lines at the rotation angles θA and θB in two phases in which the failed electric current flow has not been generated (refer to FIGS. 4 to 6), the d-axis electric current (Id) changing in accordance with a tangent curve with asymptotic lines at the rotation angles θA and θB as shown in FIGS. 17 to 19 is generated in the d/g coordinate system. Accordingly, in order to generate the phase electric current changing in accordance with a secant curve or a cosecant curve with asymptotic lines at the rotation angles θA and θB in the two phases on the basis of the execution of the feedback control in the d/q coordinate system at a time of the two phase drive mode, it is necessary to calculate the d-axis electric current command value Id* changing in accordance with a tangent curve with asymptotic lines at the rotation angles θA and θB as shown in FIGS. 17 to 19.

Even at a time of the two phase drive mode, the d-axis electric current value Id is regularly changed in correspondence to the rotation angle θ. Accordingly, it is possible to determine whether there is an anomaly in the control system in the same manner as the case of monitoring the change of the q-axis electric current, even by monitoring the change of the d-axis electric current value Id. In the third embodiment, the anomaly detection in the control system is executed by calculating the hypothetical d-axis electric current command value Id* as described above, on the basis of the following characteristic of the actual d-axis electric current value Id with respect to the d-axis electric current command value Id*, that is, whether the d-axis electric current deviation ΔId corresponding to the deviation between the d-axis electric current command value Id* and the d-axis electric current value Id is within a suitable range (+I2).

In the case that the rotation angle θ exists within any of the limiting ranges (θ1<θ<θ2 or θ3<θ<θ4) near the rotation angles θA and θB at a time of the two phase drive mode, the guarding procedure described above limiting the phase electric current command value within the predetermined range is executed. Accordingly, the d-axis electric current value Id is not changed in accordance with a tangent curve with asymptotic lines at the rotation angles θA and θB, within the limiting ranges. Accordingly, in the third embodiment, the anomaly detecting section 31 calculates the hypothetical d-axis electric current command value Id* while taking into consideration the result of the guarding procedure executed within the limiting ranges, that is, taking into consideration the fact that the phase electric current command value Ix* is limited, in the case that the rotation angle θ exist within any of the limiting ranges.

Specifically, in the case that the rotation angle θ exists within the other range (0<θ<θ1 or θ2≦θ≦θ3 or θ4≦θ≦2π) than the limiting ranges near the rotation angles θA and θB, the anomaly detecting section 31 calculates the hypothetical d-axis electric current command value Id* by solving any of the following expressions (35) to (37) in correspondence to the phase in which the failure of electric current flow has occurred.

In the case that a failure of electric current flow has occurred in the U phase:

$$I_d^* = I_q^* \frac{\sin\theta}{\cos\theta} = I_q^* \tan\theta \quad (35)$$

In the case that a failure of electric current flow has occurred in the V phase:

$$I_d^* = -I_q^* \frac{\sin\left(\theta + \frac{\pi}{3}\right)}{\sin\left(\theta - \frac{\pi}{6}\right)} = I_q^* \tan\left(\theta - \frac{2\pi}{3}\right) \quad (36)$$

In the case that a failure of electric current flow has occurred in the W phase:

$$I_d^* = -I_q^* \frac{\sin\left(\theta + \frac{2\pi}{3}\right)}{\sin\left(\theta + \frac{\pi}{6}\right)} = I_q^* \tan\left(\theta + \frac{2\pi}{3}\right) \quad (37)$$

With regard to the rotation angles θ1 and θ2 defining the limiting range including the rotation angle θA and the rotation angles θ3 and θ4 defining the limiting range including rotation angle θB, refer to FIGS. 13 to 15 and the expressions (5) to (22) mentioned above.

In the case that the rotation angle θ exists in any of the limiting ranges (θ1<θ<θ2 or θ3<θ<θ4), the anomaly detecting section 31 calculates the hypothetical d-axis electric current command value Id* by solving any of the following expressions (38) to (49) in correspondence to the phase in which the failure of electric current flow has occurred, and in correspondence to the sign of the q-axis electric current command value Iq*.

In the case that a failure of electric current flow has occurred in the U phase and θ1<θ<π/2 or 3π/2<θ<θ4:

$$I_d^* = \sqrt{2} I_{x\_max} \sin\theta \, (I_q^* \geq 0) \quad (38)$$

$$I_d^* = -\sqrt{2} I_{x\_max} \sin\theta \, (I_q^* < 0) \quad (39)$$

In the case that a failure of electric current flow has occurred in the U phase and π/2<θ<θ2 or θ3<θ<3π/2:

$$I_d^* = -\sqrt{2} I_{x\_max} \sin\theta \, (I_q^* \geq 0) \quad (40)$$

$$I_d^* = \sqrt{2} I_{x\_max} \sin\theta \, (I_q^* < 0) \quad (41)$$

In the case that a failure of electric current flow has occurred in the V phase and θ1<θ<π/6 or 7π/6<θ<θ4:

$$I_d^* = I_{x\_max}\left(\sqrt{\frac{3}{2}}\cos\theta + \sqrt{\frac{1}{2}}\sin\theta\right) (I_q^* \geq 0) \quad (42)$$

$$I_d^* = -I_{x\_max}\left(\sqrt{\frac{3}{2}}\cos\theta + \sqrt{\frac{1}{2}}\sin\theta\right) (I_q^* < 0) \quad (43)$$

In the case that a failure of electric current flow has occurred in the V phase and π/6<θ<θ2 or θ3<θ<7π/6:

$$I_d^* = -I_{x\_max}\left(\sqrt{\frac{3}{2}}\cos\theta + \sqrt{\frac{1}{2}}\sin\theta\right) (I_q^* \geq 0) \quad (44)$$

$$I_d^* = I_{x\_max}\left(\sqrt{\frac{3}{2}}\cos\theta + \sqrt{\frac{1}{2}}\sin\theta\right) (I_q^* < 0) \quad (45)$$

In the case that a failure of electric current flow has occurred in the W phase and θ1<θ<5π/6 or 11π/6<θ<θ4:

$$I_d^* = I_{x\_max}\left(-\sqrt{\frac{3}{2}}\cos\theta + \sqrt{\frac{1}{2}}\sin\theta\right) (I_q^* \geq 0) \quad (46)$$

$$I_d^* = -I_{x\_max}\left(-\sqrt{\frac{3}{2}}\cos\theta + \sqrt{\frac{1}{2}}\sin\theta\right) (I_q^* < 0) \quad (47)$$

In the case that a fail of electric current flow has occurred in the W phase and 5π/6<θ<θ2 or θ3<θ<11π/6:

$$I_d^* = -I_{x\_max}\left(-\sqrt{\frac{3}{2}}\cos\theta + \sqrt{\frac{1}{2}}\sin\theta\right) (I_q^* \geq 0) \quad (48)$$

$$I_d^* = I_{x\_max}\left(-\sqrt{\frac{3}{2}}\cos\theta + \sqrt{\frac{1}{2}}\sin\theta\right) (I_q^* < 0) \quad (49)$$

The deviation between the hypothetical d-axis electric current command value Id* determined in accordance with any of the expressions (35) to (49) and the actual d-axis electric current value Id, that is, the d-axis electric current deviation ΔId is compared with the predetermined threshold value I2. The detection accuracy of anomaly of the control system is improved by executing the anomaly detection of the control system on the basis of a result of comparison.

Next, a description will be given of a manner in which an anomaly of the control system is detected in a third embodiment.

In a flowchart in FIG. 20 referred below, processes of steps 601 to 612 are the same as the processes of steps 401 to 412 in the flowchart of FIG. 12 mentioned above and illustrating the first embodiment, except a point that a state quantity acquired in step 601 further includes the q-axis electric current command value Id* and the q-axis electric current value Id. Accordingly, a description of steps 601 to 612 in FIG. 20 is omitted.

Figure 20:
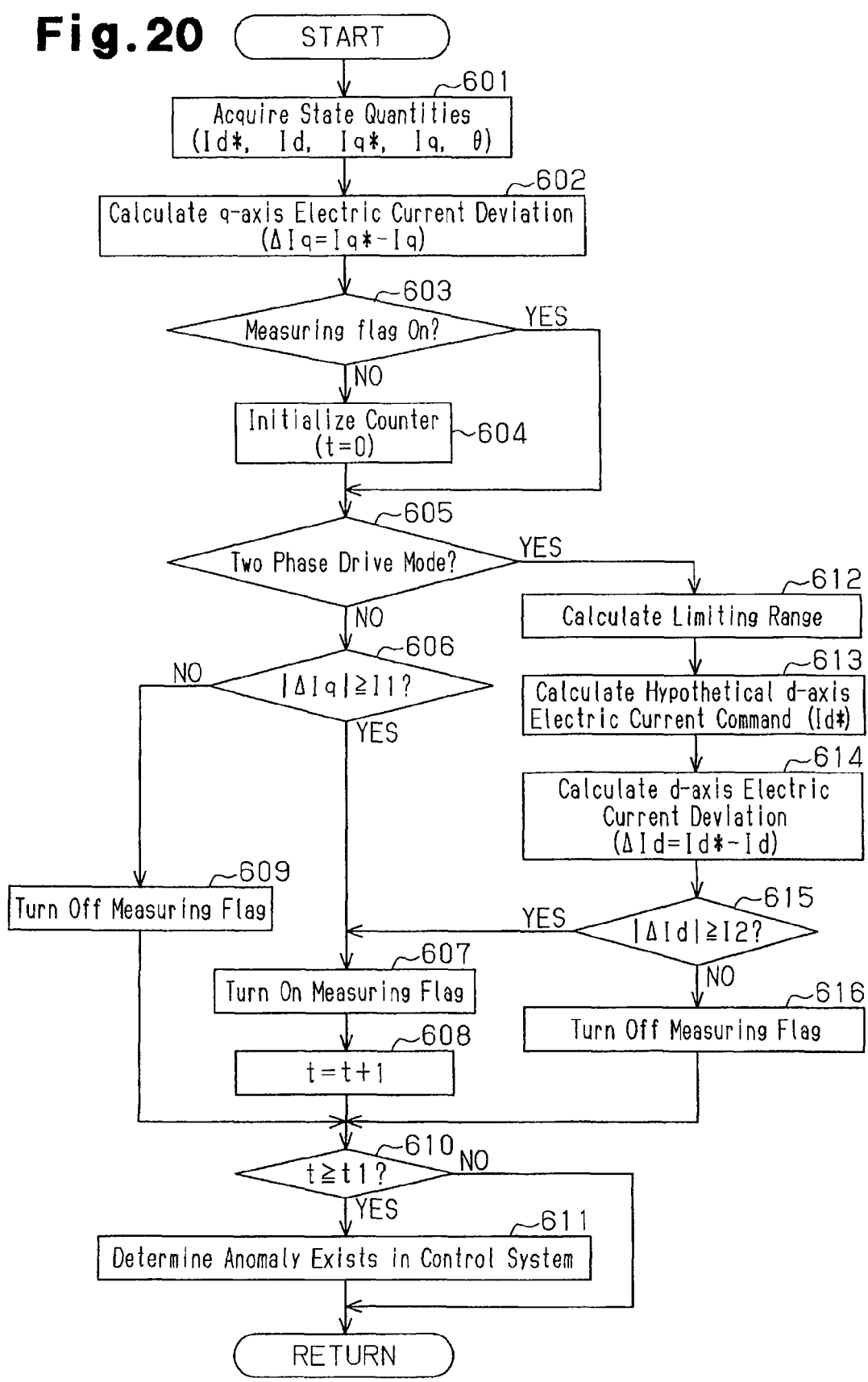
FIG. 20 is a flowchart representing a routine for detecting an anomaly in a control system carried out by an EPS in accordance with a third embodiment of the present invention.
Figure 21:
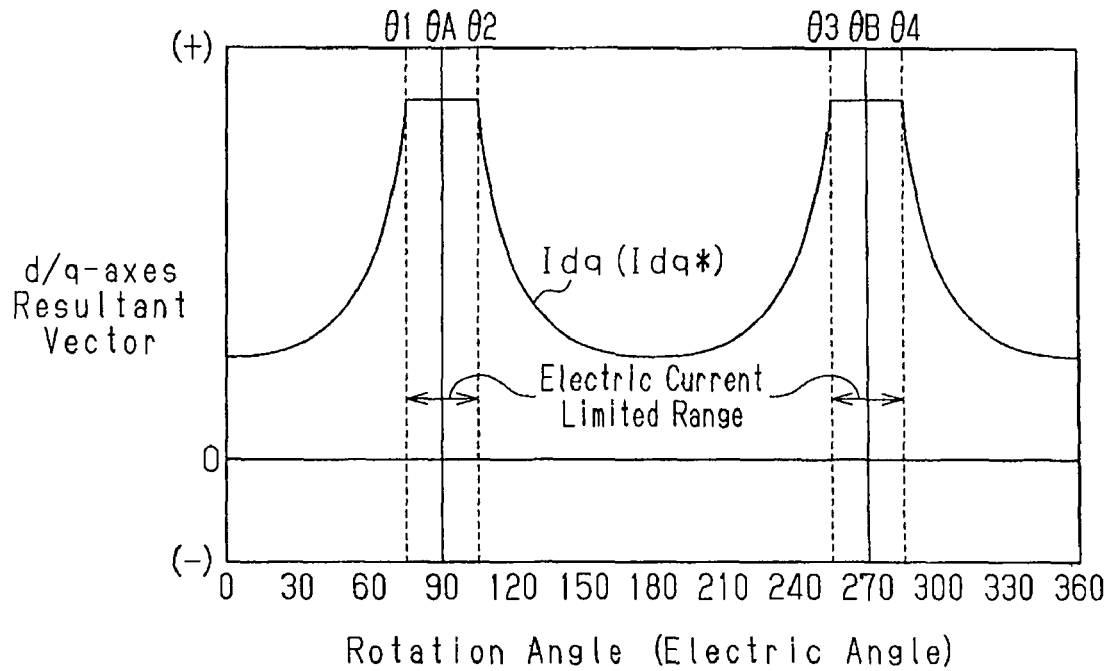
FIG. 21 is a graph showing a change of a d/q axis resultant vector at a time of a two-phase drive mode of the EPS in accordance with the third embodiment in the case that a failure of electric current flow has occurred in a U-phase.
Figure 22:
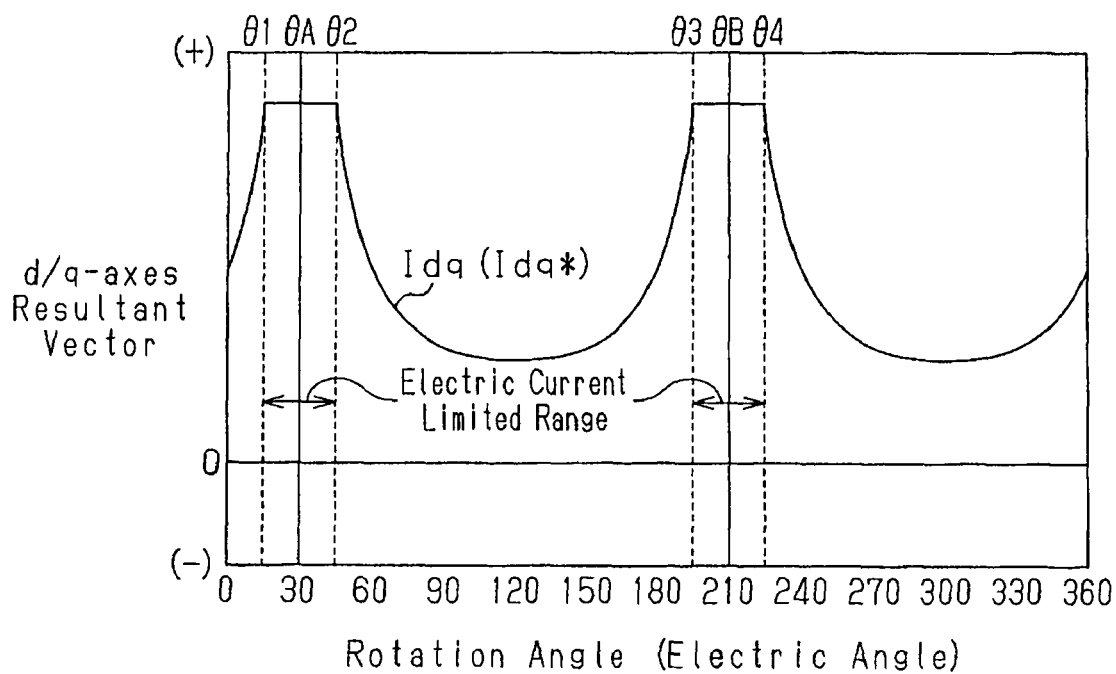
FIG. 22 is a graph showing a change of the d/q axis resultant vector at a time of the two-phase drive mode of the EPS in accordance with the third embodiment in the case that a failure of electric current flow has occurred in a V-phase.
Figure 23:
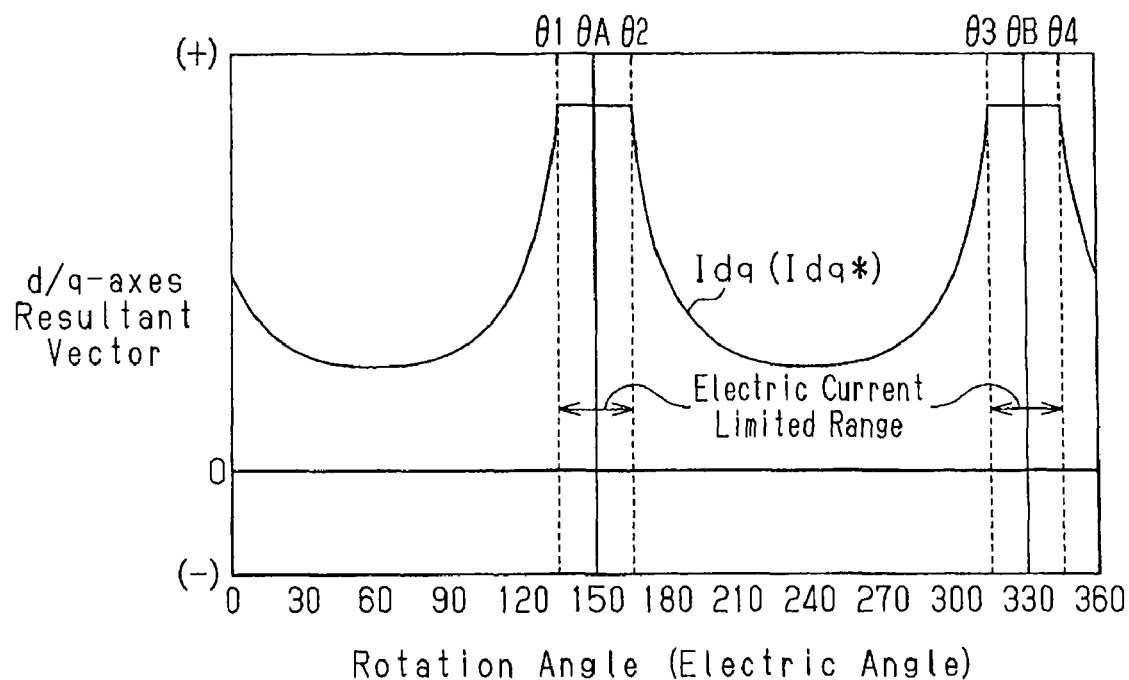
FIG. 23 is a graph showing a change of the d/q axis resultant vector at a time of the two-phase drive mode of the EPS in accordance with the third embodiment in the case that a failure of electric current flow has occurred in a W-phase.

As shown in FIG. 20, in the case that it is determined that the control mode is the two phase drive mode (step 605: YES), the anomaly detecting section 31 calculates the limiting range in step 612. Thereafter, the anomaly detecting section 31 calculates the hypothetical d-axis electric current command value Id* in accordance with any of the expressions (35) to (49) mentioned above, in correspondence to the phase in which the failure of electric current flow has occurred, and in correspondence to the sign of the q-axis electric current command value Iq*. Next, the anomaly detecting section 31 calculates the deviation between the calculated hypothetical d-axis electric current command value Id* and the actual d-axis electric current value Id, that is, the d-axis electric current deviation ΔId in step 614, and determines whether (the absolute value of) the calculated d-axis electric current deviation ΔId is equal to or more than the predetermined threshold value I2 in step 615. In the case that it is determined that (the absolute value of) the d-axis electric current deviation ΔId is equal to or more than the predetermined threshold value I2 (ΔId≧I2, step 615: YES), the anomaly detecting section 31 executes the processes of steps 607 and 608. In other words, the measuring flag is turned on in step 607 and the counter value t is incremented by one in step 608 (t=t+1).

On the other hand, in the case that it is determined that (the absolute value of) the d-axis electric current deviation ΔId is less than the predetermined threshold value I2 in step 615 (ΔId<I2, step 615: NO), that is, in the case that it is determined that the d-axis electric current deviation ΔId exists in a suitable range, the anomaly detecting section 31 turns off the measuring flag in step 616.

Thereafter, the anomaly detecting section 31 determines whether the counter value t is equal to or more than the threshold value t1 in step 610. In the case that it is determined that the counter value t is equal to or more than the threshold value t1 (step 610: YES), the anomaly detecting section 31 determined that there is an anomaly in the control system in step 611.

In accordance with the third embodiment described above, it is possible to avoid an erroneous detection of an anomaly of the control system at a time when the rotation angle θ exists within any of the limiting ranges (θ1<θ<θ2 or θ3<θ<θ4) near the rotation angles θA and θB. As a result, the detection accuracy of anomaly of the control system is improved.

Fourth Embodiment

A description will be given below of a fourth embodiment in accordance with the present invention with reference to FIG. 24. A main different point of the fourth embodiment from the third embodiment described above exists in a manner in which an anomaly of the control system is detected. In the following description, the same reference numerals are attached to the same portions as those of the third embodiment, and a description thereof will be omitted.

In the fourth embodiment, the anomaly detecting section 31 calculates the hypothetical d-axis electric current command value Id* in the same manner as the case of the third embodiment described above. In addition, the anomaly detecting section 31 calculates a resultant vector Idq* of the d-axis electric current command value Id* and the q-axis electric current command value Iq* (refer to FIGS. 21 to 23). The resultant vector Idq* of the hypothetical electric current command value in the d/q coordinate system corresponds to the root sum square of the d-axis electric current command value Id* and the q-axis electric current command value Iq*. The resultant vector Idq of the actual electric current value in the d/q coordinate system described below corresponds to the root sum square of the d-axis electric current value Id and the q-axis electric current value Iq. The anomaly detecting section 31 executes an anomaly detection in the control system through a monitoring of the change of the resultant vector Idq*.

Describing in detail, the anomaly detecting section 31 calculates the resultant vector Idq* of the hypothetical electric current command value in the d/q coordinate system by solving any of the following expressions (50) to (53) in correspondence to whether the rotation angle θ exists within any of the limiting ranges (θ1<θ<θ2 or θ3<θ<θ4), and in correspondence to the phase in which the failure of electric current flow has occurred.

In the case that the rotation angle θ does not exist within any of the limiting ranges (θ1<θ<θ2 or θ3<θ<θ4), and a failure of electric current flow has occurred in the U phase:

$$I_{dq}^* = \sqrt{\frac{2I_q^{*2}}{\cos 2\theta + 1}} \qquad (50)$$

In the case that the rotation angle θ does not exist within any of the limiting ranges (θ1<θ<θ2 or θ3<θ<θ4), and a failure of electric current flow has occurred in the V phase:

$$I_{dq}^* = 2\sqrt{\frac{I_q^{*2}}{2 - \cos 2\theta - \sqrt{3}\sin 2\theta}} \qquad (51)$$

In the case that the rotation angle θ does not exist within any of the limiting ranges (θ1<θ<θ2 or θ3<θ<θ4), and a failure of electric current flow has occurred in the W phase:

$$I_{dq}^* = 2\sqrt{\frac{I_q^{*2}}{2 - \cos 2\theta + \sqrt{3}\sin 2\theta}} \qquad (52)$$

In the case that the rotation angle θ exists within any of the limiting ranges (θ1<θ<θ2 or θ3<θ<θ4), and a failure of electric current flow has occurred in any of the U, V and W phases:

$$I_{dq}^* = \sqrt{2} I_{x\_max} \qquad (53)$$

With regard to the rotation angles θ1 and θ2 defining the limiting range including the rotation angle θA, and the rotation angles θ3 and θ4 defining the limiting range including the rotation angle θB, refer to FIGS. 13 to 15 and the expressions (5) to (22) mentioned above.

The deviation ΔIdq between the resultant vector Idq* of the hypothetical electric current command value in the d/q coordinate system determined as mentioned above and the resultant vector of the actual electric current value in the d/q coordinate system (the resultant vector of the d-axis electric current value Id and the q-axis electric current value Iq) is compared with a predetermined threshold value I3. The anomaly detection of the control system is carried out on the basis of the result of the comparison.

Next, a description will be given of a manner in which an anomaly of the control system is detected in the fourth embodiment.

In a flowchart of FIG. 24 referred below, processes of steps 701 to 713 are the same as the processes of steps 601 to 613 in the flowchart of FIG. 20 mentioned above and illustrating the third embodiment. Accordingly, the description of steps 701 to 713 in FIG. 24 will be omitted.

Figure 24:
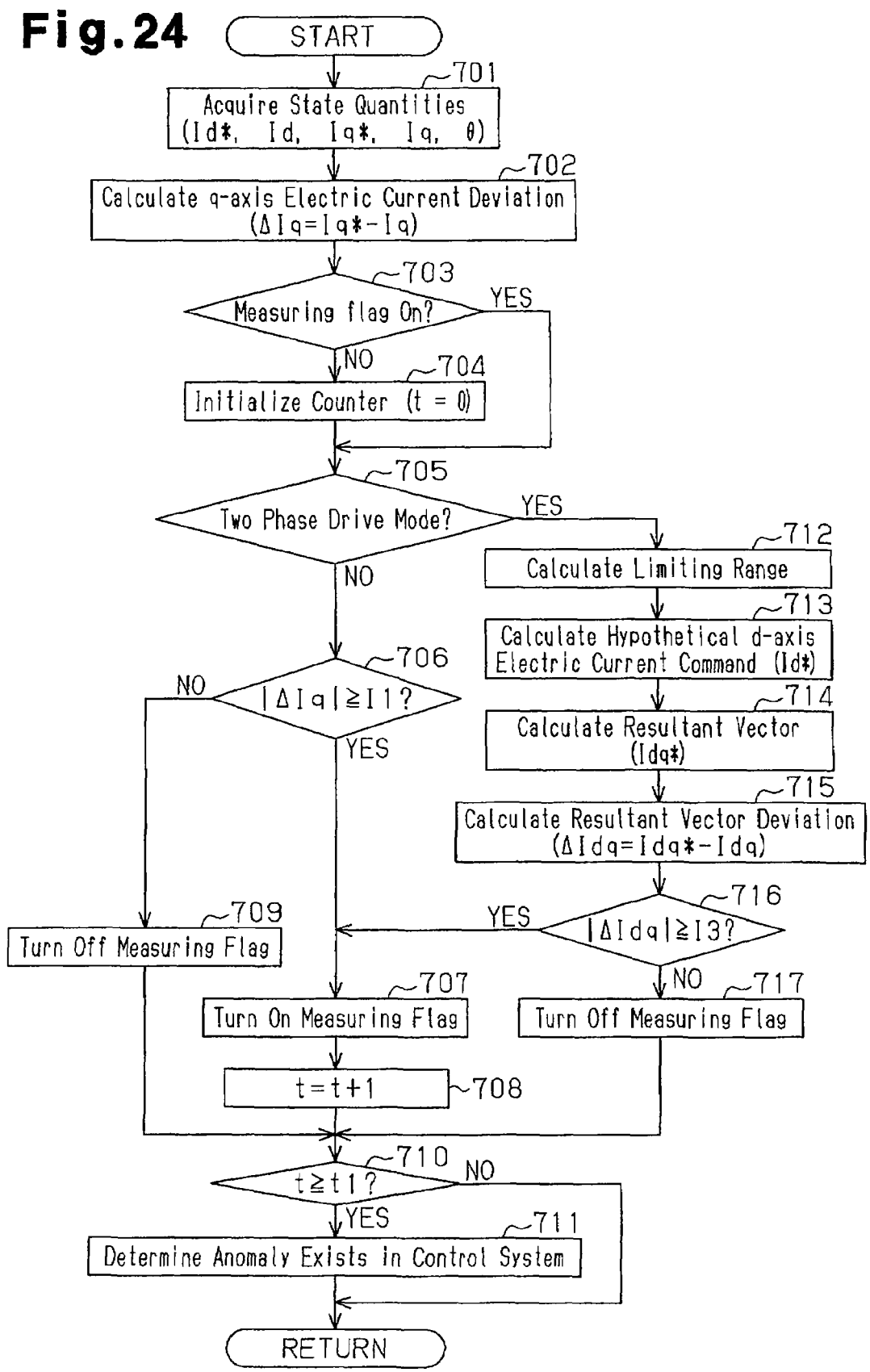
FIG. 24 is a flowchart representing a routine for detecting an anomaly in a control system carried out by an EPS in accordance with a fourth embodiment of the present invention.

As shown in FIG. 24, the anomaly detecting section 31 calculates the hypothetical d-axis electric current command value Id* in step 713 in the same manner as the case of the third embodiment, and subsequently calculates the resultant vector Idq* of the d-axis electric current command value Id* and the q-axis electric current command value Iq* in step 714. Next, the anomaly detecting section 31 calculates the deviation Idq between the resultant vector Idq* and the resultant vector of the actual electric current value in the d/q coordinate system (the resultant vector of the d-axis electric current value Id and the q-axis electric current value Iq) in step 715 (ΔIdq=Idq*−Idq), and determines whether the calculated deviation ΔIdq is equal to or more than the predetermined threshold value I3 in step 716. In the case that it is determined that (the absolute value of) the deviation ΔIdq is equal to or more than the predetermined threshold value I3 (ΔIdq≧I3, step 716: YES), the anomaly detecting section 31 executes the processes of steps 707 and 708. In other words, the measuring flag is turned on in step 707, and the counter value t is incremented by one in step 708 (t=t+1).

On the other hand, in the case that it is determined that (the absolute value of) the deviation ΔIdq is less than the predetermined threshold value I3 (ΔIdq<I3, step 716: NO) in step 716, that is, in the case that the deviation ΔIdq exists in a suitable range, the anomaly detecting section 31 turns off the measuring flag in step 717.

Thereafter, the anomaly detecting section 31 determines whether the counter value t is equal to or more than the threshold value t1 in step 710. In the case that it is determined that the counter value t is equal to or more than the threshold value t1 (step 710: YES), the anomaly detecting section 31 determines that there is an anomaly in the control system in step 611.

In accordance with the fourth embodiment described above, it is possible to avoid an erroneous detection of an anomaly of the control system at a time when the rotation angle θ exists within any of the limiting ranges (θ1<θ<θ2 or θ3<θ<θ4) near the rotation angles θA and θB. As a result, the detection accuracy of anomaly of the control system is improved.

Fifth Embodiment

A description will be given of a fifth embodiment in accordance with the present invention with reference to FIG. 25. A main different point of the fifth embodiment from the first embodiment described above exists in a manner in which an anomaly of the control system is detected. In the following description, the same reference numerals are attached to the same portions as those of the first embodiment, and a description thereof will be omitted.

In the fifth embodiment, the anomaly detecting section 31 selects one of two energized phases (two phases in which no failure of electric current has been occurred) as a determining phase at a time of the two phase drive mode. The anomaly detecting section 31 executes the anomaly detection in the control system through the monitoring of the phase electric current deviation in the determining phase.

In other words, as long as there is no anomaly in the control system, a phase electric current value Iy in the determining phase is continuously changed following to a phase electric current command value Iy* except the rotation angles θA and θB by executing a phase electric current feedback control on the basis of the phase electric current command value changing in accordance with a secant curve or a cosecant curve with asymptotic lines at the rotation angles θA and θB. Accordingly, it is possible to improve the detection accuracy of anomaly of the control system at a time of the two phase drive mode over a wide range of rotation angle by comparing a deviation between the phase electric current value Iy and the phase electric current command value Iy*, that is, a phase electric current deviation ΔIy with a predetermined threshold value I4.

Next, a description will be given of a manner in which an anomaly of the control system is detected in the fifth embodiment.

In a flowchart of FIG. 25 referred below, processes of steps 801 to 811 are the same as the processes of steps 401 to 411 in the flowchart of FIG. 12 mentioned above and illustrating the first embodiment except a point that a state quantity acquired in step 801 further includes phase electric current values Iu, Iv and Iw and phase electric current command values Iu*, Iv* and Iw*. Accordingly, the description of steps 801 to 811 in FIG. 25 will be omitted.

Figure 25:
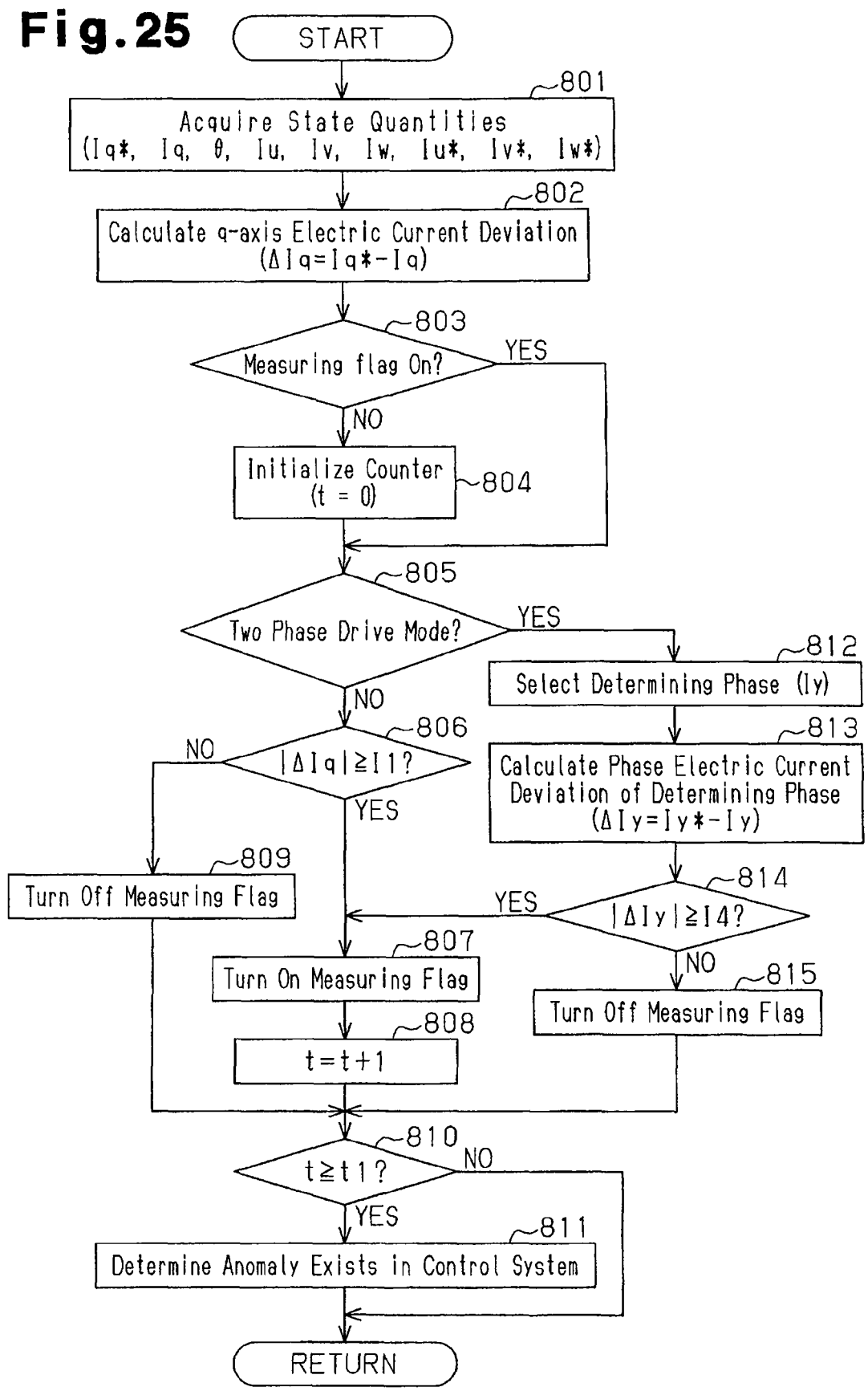
FIG. 25 is a flowchart representing a routine for detecting an anomaly in a control system carried out by an EPS in accordance with a fifth embodiment of the present invention.

As shown in FIG. 25, the anomaly detecting section 31 selects one of two energized phases as a determining phase in step 812, in the case that it is determined that the control mode is the two phase drive mode. It is possible to previously determine which of the two energized phases is selected as the determining phase, for example, in correspondence to the phase in which the failure of electric current flow has occurred. Subsequently, the anomaly detecting section 31 calculates the phase electric current deviation ΔIy in the determining phase in step 813 (ΔIy=Iy*−Iy), and determines whether (the absolute value of) the calculated phase electric current deviation ΔIy is equal to or more than the predetermined threshold value I4 in step 814. In the case that it is determined that (the absolute value of) the phase electric current deviation ΔIy is equal to or more than the predetermined threshold value I4 (|ΔIy|≧I4, step 814: YES), the anomaly detecting section 31 executes the processes of steps 807 and 808. In other words, the measuring flag is turned on in step 807, and the counter value t is incremented by one in step 808 (t=t+1).

On the other hand, in the case that it is determined that (the absolute value of) the phase electric current deviation ΔIy is less than the predetermined threshold value I4 in step 814 (|ΔIy|<I4, step 814: NO), that is, in the case that the phase electric current deviation ΔIy is within a suitable range, the anomaly detecting section 31 turns off the measuring flag in step 815.

Thereafter, the anomaly detecting section 31 determines whether the counter value t is equal to or more than the threshold value t1 in step 810. In the case that it is determined that the counter value t is equal to or more than the threshold value t1 (step 810: YES), the anomaly detecting section 31 determines that there is an anomaly in the control system in step 811.

In accordance with the fifth embodiment described above, it is possible to avoid an erroneous detection of an anomaly of the control system at a time when the rotation angle θ exists within any of the limiting ranges (θ1<θ<θ2 or θ3<θ<θ4) near the rotation angles θA and θB. As a result, the detection accuracy of anomaly of the control system is improved.

Sixth Embodiment

A description will be given of a sixth embodiment in accordance with the present invention with reference to FIG. 26. A main different point of the sixth embodiment from the first embodiment described above exists in a manner in which an anomaly of the control system is detected. In the following description, the same reference numerals are attached to the same portions as those of the first embodiment, and a description thereof will be omitted.

In the sixth embodiment, the anomaly detecting section 31 monitors the phase electric current values Iy1 and Iy2 of two energized phases (two phases in which no failure of electric current has been occurred) at a time of the two phase drive mode, and compares (an absolute value of) a total value Iz of the phase electric current value Iy1 and the phase electric current value Iy2 with a predetermined threshold value I5.

The anomaly detection of the control system is executed on the basis of the result of comparison.

In accordance with Kirchhoff's law, the total value Iz of the phase electric current values Iy1 and Iy2 of two energized phases is expected to come to zero as long as there is no anomaly in the control system. Accordingly, in the case that (the absolute value of) the total value Iz deviates from 0 and gets over a suitable range, it is possible to determine that there is an anomaly in the control system.

Figure 26:
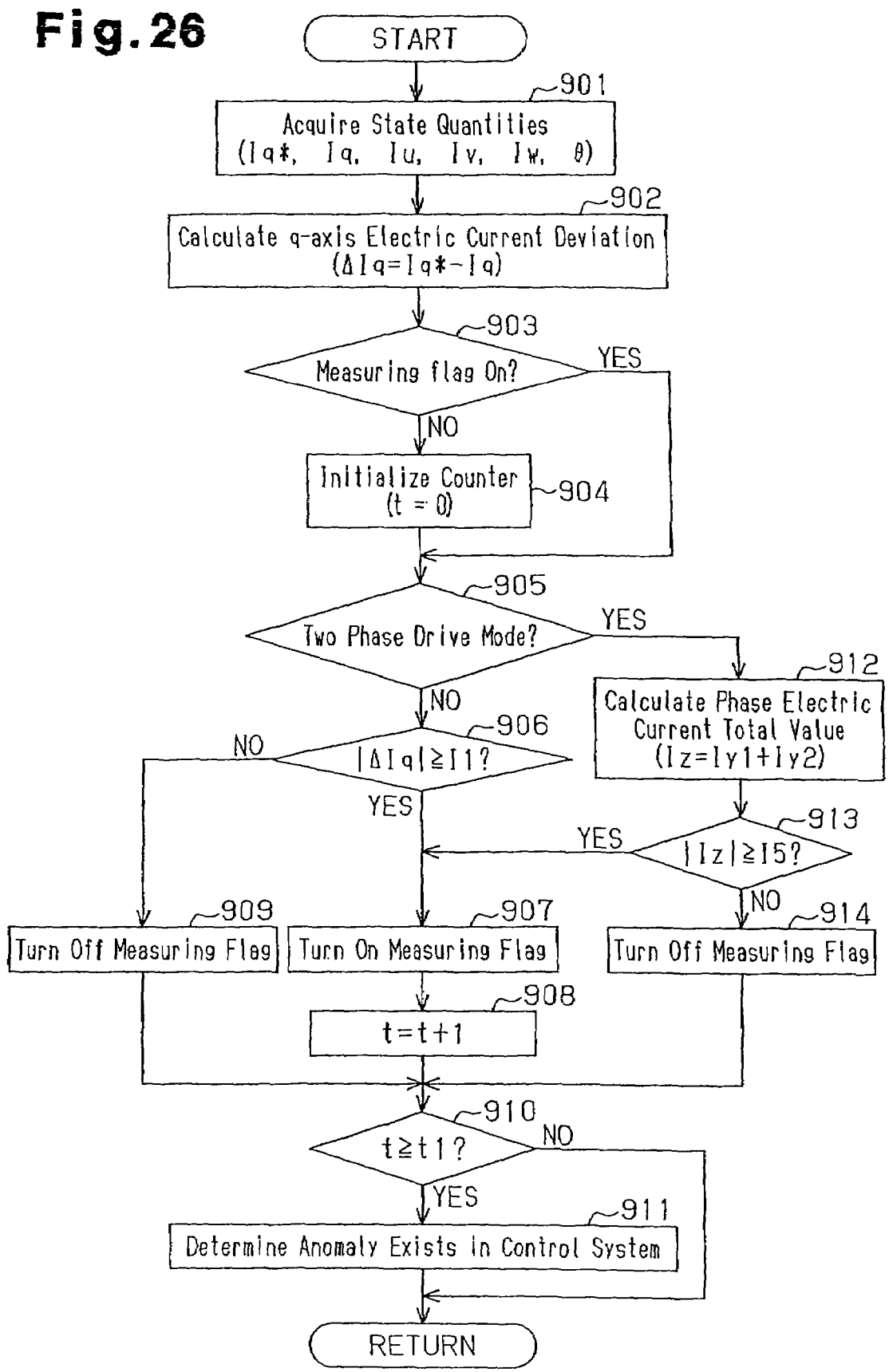
FIG. 26 is a flowchart representing a routine for detecting an anomaly in a control system carried out by an EPS in accordance with a sixth embodiment of the present invention.
Figure 27:
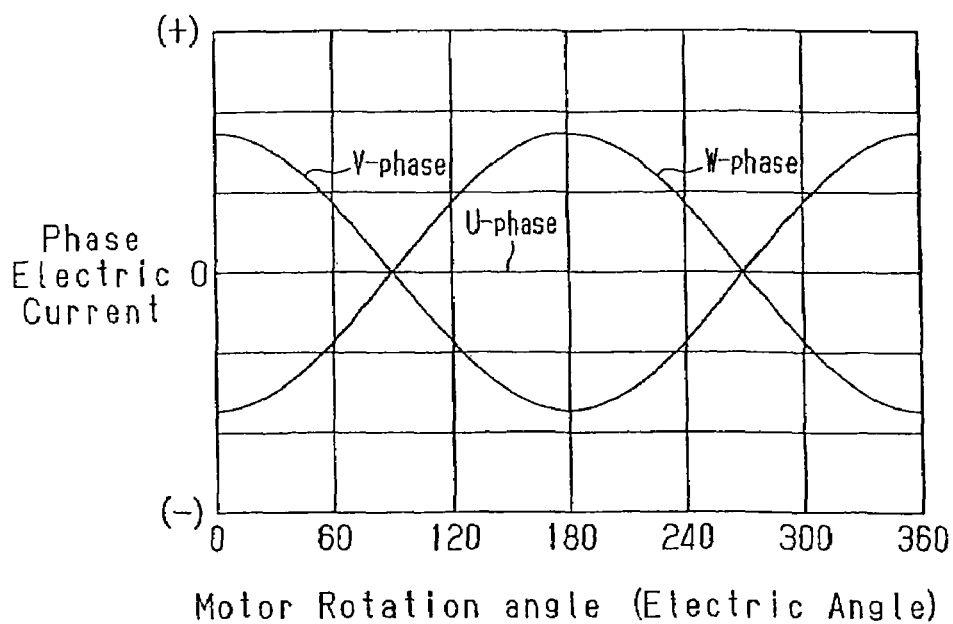
FIG. 27 is a graph showing changes of phase electric currents at a time of a two phase drive mode of a conventional EPS.
Figure 28:
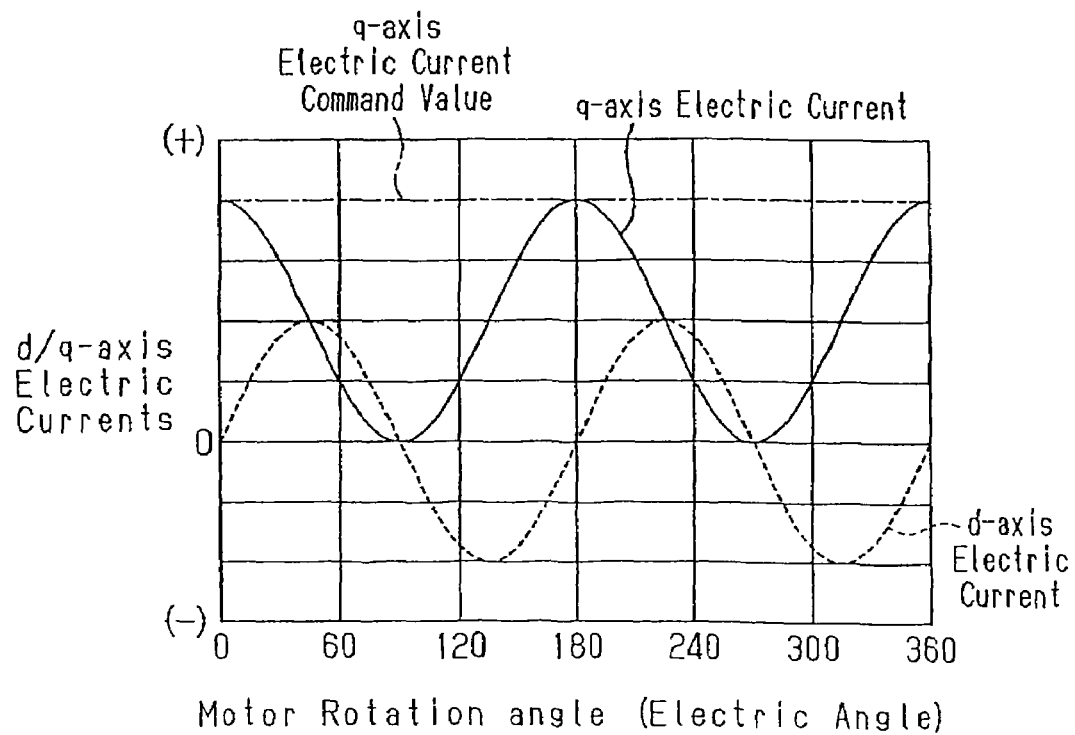
FIG. 28 is a graph showing a change of d-axis electric current and a change of q-axis electric current at a time of the two phase drive mode of the conventional EPS.

As shown in FIG. 26, in the case that it is determined that the control mode is the two phase drive mode (step 905:YES), the anomaly detecting section 31 calculates the total value Iz of the phase electric current values Iy1 and Iy2 of two energized phases in step 912 (Iz=Iy1+Iy2). Subsequently, the anomaly detecting section 31 determines whether (the absolute value of) the calculated total value Iz is equal to or more than a predetermined threshold value I5 in step 913. In the case that (the absolute value of) the total value ΔIz is equal to or more than the predetermined threshold value I5 (|Iz|≧I5, step 913:YES), the anomaly detecting section 31 executes the processes of steps 907 and 908. In other words, the measuring flag is turned on in step 907, and the counter value t is incremented by one in step 908 (t=t+1).

On the other hand, in the case that it is determined that (the absolute value of) the total value Iz is less than the predetermined threshold value I5 (|Iz|<I5, step 913: NO), that is, in the case that it is determined that the total value Iz exists in the suitable range, the anomaly detecting section 31 turns off the measuring flag in step 914.

Thereafter, the anomaly detecting section 31 determines whether the counter value t is equal to or more than the threshold value t1 in step 910. In the case that it is determined that the counter value t is equal to or more than the threshold value t1 (step 910: YES), the anomaly detecting section 31 determines that there is an anomaly in the control system in step 911.

The processes of steps 901 to 911 in FIG. 26 are the same as the processes of steps 401 to 411 in the flowchart of FIG. 12 mentioned above and illustrating the first embodiment except the point that the state quantity acquired in step 901 further includes the phase electric current values Iu, Iv and Iw. Accordingly, the description of steps 901 to 911 will be omitted.

In accordance with the sixth embodiment described above, it is possible to accurately detect the anomaly of the control system even at a time of the two phase drive mode. Particularly, since it is possible to avoid an erroneous detection of an anomaly of the control system at a time when the rotation angle θ exists within any of the limiting ranges (θ1<θ<θ2, θ3<θ<θ4) near the rotation angles θA and θB, it is possible to improve the detection accuracy of anomaly of the control system over a wide range of rotation angle. In addition, the manner in which an anomaly of the control system is detected in the present embodiment is advantageous in a point that the it can be applied to the two phase drive mode which does not utilize the phase electric current feedback.

The illustrated embodiments may be modified as follows.

Although the present invention is embodied as the motor controller of the electric power steering apparatus (the EPS) in the illustrated embodiments, the invention may be embodied as a motor controller for uses other than the use in the EPS.

In the illustrated embodiments, the ECU 11 as the motor controller operates in the three control modes, which are the normal control mode, the assist suspension mode, and the two phase drive mode. However, the ECU 11 may operate in any suitable modes other than those of the embodiment as long as the motor 12 is operated using the two phases other than the phase with a failed electric current flow if such failure occurs. Also, the anomaly detecting section 31 may determine whether an anomaly has occurred using any suitable procedure other than that of the embodiment.

In the illustrated embodiments, the electric current command value calculating section 23 outputs the phase electric current command value for one of the two phases other than the phase with the failed electric current flow. The motor control signal generating section 24 calculates the phase voltage command value for the phase using the phase electric current command value provided by the electric current command value calculating section 23. The motor control signal generating section 24 then determines the phase voltage command values for the other two phases. However, the present invention is not restricted to this. The electric current command value calculating section 23 may output phase electric current command values for both of the two phases other than the phase with the failure of electric current flow.

In the illustrated embodiments, using the expressions (1) to (3), the phase electric current command value Iv* of the V-phase is calculated if a failure of electric current flow occurs in the U-phase or the W-phase. Further, the phase electric current command value Iu* of the U-phase is calculated if such failure occurs in the V-phase. However, the present invention is not restricted to this. That is, the phase electric current command value (Iw*) of the W-phase may be calculated if a failure of electric current flow occurs in the U-phase or the V-phase. Further, if such failure occurs in the W-phase, the phase electric current command value (Iv*) of the V-phase may be calculated. In this case, the expressions (1) to (3) need to be applied with the signs reversed.

The phase voltage command value, which is set if a failure of electric current flow occurs in any one of the phases of the motor 12, does not necessarily have to be precisely equal to the value calculated using the expressions (1) to (3). Even if the phase electric current command value is set to a value changing substantially in accordance with the secant or cosecant curve or in a manner similar to this with the asymptotic lines at the specific rotation angles, advantages similar to those of the illustrated embodiments are ensured. However, the phase electric current command values obtained by the expressions (1) to (3) are optimal since these values lead to generations of the motor electric current optimally matching the required torque.

In each of the embodiments described above, the anomaly detection of the control system at the normal time is carried out by utilizing the q-axis electric current deviation ΔIq, however, may be carried out by utilizing the d-axis electric current deviation ΔId, or the resultant vector deviation in the d/q coordinate system. In the case that the anomaly detection of the control system at the normal time is carried out by utilizing the d-axis electric current deviation ΔId, the threshold value used in the anomaly detection of the control system utilizing the d-axis electric current deviation ΔId may be changed in the second embodiment described above. Further, in the case that the anomaly detection of the control system at the normal time is carried out by utilizing the resultant vector deviation in the d/q coordinate system, the threshold value used in the anomaly detection of the control system utilizing the resultant vector deviation may be changed in the second embodiment described above.

In the third embodiment described above, as the hypothetical electric current command value corresponding to the phase electric current command value Ix* used in the anomaly detection of the control system at a time of the two phase drive mode, the d-axis electric current command value Id* is calculated, and the d-axis electric current deviation ΔId is utilized in the anomaly detection of the control system. Further, in the fourth embodiment described above, the resultant vector Idq* is calculates as the hypothetical electric current command value mentioned above, and the deviation ΔIdq of the resultant vector is utilized in the anomaly detection of the control system. However, the structure is not limited to these, but the q-axis electric current command value may be calculated as the hypothetical electric current command value, and the q-axis electric current deviation may be utilized in the anomaly detection of the control system.

In the fourth embodiment described above, the expressions (50) to (53) used at a time of calculating the resultant vector Idq* is introduced by assembling the root sum square of the d-axis electric current command value Id* and the q-axis electric current command value Iq*, however, the d-axis electric current command value Id* does not exist in each of the expressions. Accordingly, in the case of using these expressions, it is not necessary to previously calculate the d-axis electric current command value Id*.

The invention claimed is:

1. A motor controller comprising:
a motor control signal output section; and
a drive circuit feeding a three phase drive power to a motor on the basis of a motor control signal output from the motor control signal output section,
wherein the motor control signal output section includes:
an electric current command value calculating section;
a motor control signal generating section generating the motor control signal by executing an electric current feedback control of a d/q coordinate system on the basis of an electric current command value calculated by the electric current command value calculating section; and
an anomaly detecting section for detecting an anomaly of a control system on the basis of an electric current deviation of the d/q coordinate system, and detecting a failure of electric current flow in any of the phases of the motor,
wherein, in a case that a failure of electric current flow occurred in any of the phases of the motor is detected by the anomaly detecting section, the electric current command value calculating section calculates a phase electric current command value changing in accordance with a secant curve or a cosecant curve with an asymptotic line at a predetermined rotation angle corresponding to the phase in which the failure of electric current flow has occurred, and the motor control signal generating section generates a motor control signal for energizing the other two phases than the phase in which the failure of electric current flow has occurred by executing a phase electric current feedback control on the basis of the calculated phase electric current command value,
wherein the motor control signal output section is provided with a guarding section for limiting the phase electric current command value calculated by the electric current command value calculating section within a predetermined range, and
wherein, in the case of detecting that a failure of electric current flow has occurred in any of the phases of the motor, the anomaly detecting section inhibits the anomaly detection of the control system if the rotation angle of the motor exists in the range in which the phase electric current command value is limited by the guarding section.

2. An electric power steering apparatus having the motor controller according to claim 1.

3. A motor controller comprising:
a motor control signal output section; and
a drive circuit feeding a three phase drive power to a motor on the basis of a motor control signal output from the motor control signal output section,
wherein the motor control signal output section includes:
an electric current command value calculating section;
a motor control signal generating section generating the motor control signal by executing an electric current feedback control of a d/q coordinate system on the basis of an electric current command value calculated by the electric current command value calculating section; and
an anomaly detecting section for detecting an anomaly of a control system on the basis of a comparison between an electric current deviation of the d/q coordinate system and a predetermined threshold value, and detecting a failure of electric current flow in any of the phases of the motor,
wherein, in a case that a failure electric current flow occurred in any of the phases of the motor is detected by the anomaly detecting section, the electric current command value calculating section calculates a phase electric current command value changing in accordance with a secant curve or a cosecant curve with an asymptotic line at a predetermined rotation angle corresponding to the phase in which the failure of electric current flow has occurred, and the motor control signal generating section generates a motor control signal for energizing the other two phases than the phase in which the failure of electric current flow has occurred by executing a phase electric current feedback control on the basis of the calculated phase electric current command value,
wherein the motor control signal output section is provided with a guarding section for limiting the phase electric current command value calculated by the electric current command value calculating section within a predetermined range, and
wherein, in the case of detecting that a failure of electric current flow has occurred in any of the phases of the motor, the anomaly detecting section changes the threshold value so as to correspond to a fluctuation of the electric current deviation of the d/q coordinate system generated by the limitation of the phase electric current command value if the rotation angle of the motor exists in the range in which the phase electric current command value is limited by the guarding section.

4. The motor controller according to claim 3, wherein the electric current command value calculating section calculates the phase electric current command value on the basis of any one of the following expressions (1) to (3) in correspondence to the phase of the motor in which the failure of electric current flow has occurred:

in the case that the failure of electric current flow has occurred in the U phase:

$$I_v^* = \frac{I_q^*}{\sqrt{2}\cos\theta} \quad (1)$$

in the case that the failure of electric current flow has occurred in the V phase:

$$I_u^* = \frac{-I_q^*}{\sqrt{2}\sin\left(\theta - \frac{\pi}{6}\right)} \quad (2)$$

in the case that the failure of electric current flow has occurred in the W phase:

$$I_v^* = \frac{I_q^*}{\sqrt{2}\sin\left(\theta + \frac{\pi}{6}\right)} \quad (3)$$

(in the expressions (1) to (3), θ indicates a rotation angle, Iq* indicates a q-axis electric current command value, Iu* indicates a U-phase electric current command value, and Iv* indicates a V-phase electric current command value), wherein the guarding section limits the phase electric current command value within a range expressed by the following expression (4):

$$-I_{x\_max} \leq I_x^{**} \leq I_{x\_max} \quad (4)$$

(in the expression (4), Ix** indicates a phase electric current command value, and Ix_max indicates an upper limit of an applicable phase electric current value), wherein the anomaly detecting section detects an anomaly of the control system on the basis of the comparison between the q-axis electric current deviation and the threshold value, wherein, in the case of detecting that a failure of electric current flow has occurred in any one of the phases of the motor the anomaly detecting section calculates a correction term β for changing the threshold value, on the basis of any one of the following expressions (5) to (16), if the rotation angle of the motor exists within the range in which the phase electric current command value is limited by the guarding section:

in the case that the failure of electric current flow has occurred in the U phase, and θ1<θ<π/2 or 3π/2<θ<θ4:

$$\beta = I_q^* - \sqrt{2}I_{x\_max}\cos\theta \; (I_q^* \geq 0) \quad (5)$$

$$\beta = I_q^* + \sqrt{2}I_{x\_max}\cos\theta \; (I_q^* < 0) \quad (6)$$

in the case that the failure of electric current flow has occurred in the U phase, and π/2<θ<θ2 or θ3<θ<3π/2:

$$\beta = I_q^* + \sqrt{2}I_{x\_max}\cos\theta \; (I_q^* \geq 0) \quad (7)$$

$$\beta = I_q^* - \sqrt{2}I_{x\_max}\cos\theta \; (I_q^* < 0) \quad (8)$$

(in the case that the failure of electric current flow has occurred in the U phase, θ1 to θ4 satisfy the following expressions, in which Iq* indicates the q-axis electric current command value, and Ix_max indicates the upper limit of the applicable electric current value), $$\theta_1 = \cos^{-1}\left(\frac{I_q^*}{\sqrt{2}\,I_{x\_max}}\right) \; (I_q^* \geq 0)$$

$$\cos^{-1}\left(\frac{-I_q^*}{\sqrt{2}\,I_{x\_max}}\right) \; (I_q^* < 0)$$

$$\theta_2 = \cos^{-1}\left(\frac{-I_q^*}{\sqrt{2}\,I_{x\_max}}\right) \; (I_q^* \geq 0)$$

$$\cos^{-1}\left(\frac{I_q^*}{\sqrt{2}\,I_{x\_max}}\right) \; (I_q^* < 0)$$

$$\theta_3 = 2\pi - \theta_2$$

$$\theta_4 = 2\pi - \theta_1$$

in the case that the failure or electric current flow has occurred in the V phase, and θ1<θ<π6 or 7π/6<θ<θ4:

$$\beta = I_q^* - I_{x\_max}\left(-\sqrt{\frac{3}{2}}\sin\theta + \sqrt{\frac{1}{2}}\cos\theta\right) \; (I_q^* \geq 0) \quad (9)$$

$$\beta = I_q^* + I_{x\_max}\left(-\sqrt{\frac{3}{2}}\sin\theta + \sqrt{\frac{1}{2}}\cos\theta\right) \; (I_q^* < 0) \quad (10)$$

in the case that the failure of electric current flow has occurred in the V phase, and π/6<θ<θ2 or θ3<θ<7π/6:

$$\beta = I_q^* + I_{x\_max}\left(-\sqrt{\frac{3}{2}}\sin\theta + \sqrt{\frac{1}{2}}\cos\theta\right) \; (I_q^* \geq 0) \quad (11)$$

$$\beta = I_q^* - I_{x\_max}\left(-\sqrt{\frac{3}{2}}\sin\theta + \sqrt{\frac{1}{2}}\cos\theta\right) \; (I_q^* < 0) \quad (12)$$

(in the case that the failure of electric current flow has occurred in the V phase, θ1 to θ4 satisfy the following expressions, in which Iq* indicates the q-axis electric current command value, and Ix_max indicates the upper limit of the applicable electric current value), $$\theta_1 = \sin^{-1}\left(\frac{-I_q^*}{\sqrt{2}\,I_{x\_max}}\right) + \frac{\pi}{6} \; (I_q^* \geq 0)$$

$$\sin^{-1}\left(\frac{I_q^*}{\sqrt{2}\,I_{x\_max}}\right) + \frac{\pi}{6} \; (I_q^* < 0)$$

$$\theta_2 = \sin^{-1}\left(\frac{I_q^*}{\sqrt{2}\,I_{x\_max}}\right) + \frac{\pi}{6} \; (I_q^* \geq 0)$$

$$\sin^{-1}\left(\frac{-I_q^*}{\sqrt{2}\,I_{x\_max}}\right) + \frac{\pi}{6} \; (I_q^* < 0)$$

$$\theta_3 = \frac{4\pi}{3} - \theta_2$$

$$\theta_4 = \frac{4\pi}{3} - \theta_1$$

in the case that the failure of electric current flow has occurred in the W phase, and θ1<θ<5π6 or 11π6<θ<θ4:

$$\beta = I_q^* - I_{x\_max}\left(\sqrt{\frac{3}{2}}\sin\theta + \sqrt{\frac{1}{2}}\cos\theta\right) \; (I_q^* \geq 0) \quad (13)$$

$$\beta = I_q^* + I_{x\_max}\left(\sqrt{\frac{3}{2}}\sin\theta + \sqrt{\frac{1}{2}}\cos\theta\right) \; (I_q^* < 0) \quad (14)$$

in the case that the failure of electric current flow has occurred in the W phase, and 5π6<θ<θ2 or θ3<θ<11π6:

$$\beta = I_q^* + I_{x\_max}\left(\sqrt{\frac{3}{2}}\sin\theta + \sqrt{\frac{1}{2}}\cos\theta\right) \quad (I_q^* \geq 0) \quad (15)$$

$$\beta = I_q^* - I_{x\_max}\left(\sqrt{\frac{3}{2}}\sin\theta + \sqrt{\frac{1}{2}}\cos\theta\right) \quad (I_q^* < 0) \quad (16)$$

(in the case that the failure of electric current flow has occurred in the W phase, θ1 to θ4 satisfy the following expressions, in which Iq* indicates the q-axis electric current command value, and Ix_max indicates the upper limit of the applicable electric current value), $$\theta_4 = \sin^{-1}\left(\frac{I_q^*}{\sqrt{2}\,I_{x\_max}}\right) - \frac{\pi}{6} \quad (I_q^* \geq 0)$$

$$\sin^{-1}\left(\frac{-I_q^*}{\sqrt{2}\,I_{x\_max}}\right) - \frac{\pi}{6} \quad (I_q^* < 0)$$

$$\theta_3 = \sin^{-1}\left(\frac{-I_q^*}{\sqrt{2}\,I_{x\_max}}\right) - \frac{\pi}{6} \quad (I_q^* \geq 0)$$

$$\sin^{-1}\left(\frac{I_q^*}{\sqrt{2}\,I_{x\_max}}\right) - \frac{\pi}{6} \quad (I_q^* < 0)$$

$$\theta_2 = \frac{2\pi}{3} - \theta_3$$

$$\theta_1 = \frac{2\pi}{3} - \theta_4$$

5. An electric power steering apparatus having the motor controller according to claim 3.

6. A motor controller comprising:
a motor control signal output section; and
a drive circuit feeding a three phase drive power to a motor on the basis of a motor control signal output from the motor control signal output section,
wherein the motor control signal output section includes:
an electric current command value calculating section;
a motor control signal generating section generating the motor control signal by executing an electric current feedback control of a d/q coordinate system on the basis of an electric current command value calculated by the electric current command value calculating section; and
an anomaly detecting section for detecting an anomaly of a control system on the basis of an electric current deviation of the d/q coordinate system, and detecting a failure of electric current flow in any of the phases of the motor,
wherein, in a case that a failure of electric current flow occurred in any of the phases of the motor is detected by the anomaly detecting section, the electric current command value calculating section calculates a phase electric current command value changing in accordance with a secant curve or a cosecant curve with an asymptotic line at a predetermined rotation angle corresponding to the phase in which the failure of electric current flow has occurred, and the motor control signal generating section generates a motor control signal for energizing the other two phases than the phase in which the failure of electric current flow has occurred, by executing a phase electric current feedback control on the basis of the calculated phase electric current command value,
wherein the motor control signal output section is provided with a guarding section for limiting the phase electric current command value calculated by the electric current command value calculating section within a predetermined range, and
wherein, in the case of detecting that a failure of electric current flow has occurred in any of the phases of the motor, the anomaly detecting section calculates a hypothetical electric current command value of the d/q coordinate system, the hypothetic electric current command value corresponding to the phase electric current command value calculated by the electric current command value calculating section, and the anomaly detecting section executes the anomaly detection of the control system on the basis of a deviation between the calculated hypothetical electric current value and an actual electric current value of the d/q coordinate system.

7. The motor controller according to claim 6, wherein the electric current command value calculating section calculates the phase electric current command value on the basis of any one of the following expressions (17) to (19) in correspondence to the phase of the motor in which the failure of electric current flow has occurred:

in the case that the failure of electric current flow has occurred in the U phase:

$$I_v^* = \frac{I_q^*}{\sqrt{2}\cos\theta} \quad (17)$$

in the case that the failure of electric current flow has occurred in the V phase:

$$I_u^* = \frac{-I_q^*}{\sqrt{2}\sin\left(\theta - \frac{\pi}{6}\right)} \quad (18)$$

in the case that the failure of electric current flow has occurred in the W phase:

$$I_v^* = \frac{I_q^*}{\sqrt{2}\sin\left(\theta + \frac{\pi}{6}\right)} \quad (19)$$

(in the expressions (17) to (19), θ indicates a rotation angle, Iq* indicates a q-axis electric current command value, Iu* indicates a U-phase electric current command value, and Iv* indicates a V-phase electric current command value),
wherein the guarding section limits the phase electric current command value within a range expressed by the following expression (20):

$$-I_{x\_max} \leq I_x^{**} \leq I_{x\_max} \quad (20)$$

(in the expression (20), Ix** indicates a phase electric current command value, and Ix_max indicates an upper limit of an applicable phase electric current value),
wherein the anomaly detecting section calculates a hypothetical d-axis electric current command value as the hypothetical electric current command value on the basis of any one of the following expressions (21) to (23), in the case of detecting that a failure of electric current flow has occurred in any phase of the motor:

in the case that a failure of electric current flow has occurred in the U phase:

$$I_d^* = I_q^* \frac{\sin\theta}{\cos\theta} = I_q^* \tan\theta \qquad (21)$$

in the case that a failure of electric current flow has occurred in the V phase:

$$I_d^* = -I_q^* \frac{\sin\left(\theta + \frac{\pi}{3}\right)}{\sin\left(\theta - \frac{\pi}{6}\right)} = I_q^* \tan\left(\theta - \frac{2\pi}{3}\right) \qquad (22)$$

in the case that a failure of electric current flow has occurred in the W phase:

$$I_d^* = -I_q^* \frac{\sin\left(\theta + \frac{2\pi}{3}\right)}{\sin\left(\theta + \frac{\pi}{6}\right)} = I_q^* \tan\left(\theta + \frac{2\pi}{3}\right) \qquad (23)$$

(in the expressions (21) to (23), θ indicates a rotation angle, Id* indicates a d-axis electric current command value, and Iq* indicates a q-axis electric current command value), wherein, in the case of detecting that a failure of electric current flow has occurred in any of the phases of the motor, the anomaly detecting section calculates the hypothetical d-axis electric current command value, on the basis of any one of the following expressions (24) to (35), if the rotation angle of the motor exists in the range in which the phase electric current command value is limited by the guarding section:

in the case that the failure electric current flow has occurred in the U phase, and θ1<θ<π2 or 3π3<θ<θ4:

$$I_d^* = \sqrt{2} I_{x\_max} \sin\theta \, (I_q^* \geq 0) \qquad (24)$$

$$I_d^* = -\sqrt{2} I_{x\_max} \sin\theta \, (I_q^* < 0) \qquad (25)$$

in the case that the failure electric current flow has occurred in the U phase, and π2<θ<θ2 or θ3<θ<3π2:

$$I_d^* = -\sqrt{2} I_{x\_max} \sin\theta \, (I_q^* \geq 0) \qquad (26)$$

$$I_d^* = \sqrt{2} I_{x\_max} \sin\theta \, (I_q^* < 0) \qquad (27)$$

(in the case that the failure electric current flow has occurred in the U phase, θ1 to θ4 satisfy the following expressions, in which Iq* indicates the q-axis electric current command value, and Ix_max indicates the upper limit of the applicable electric current value)

$$\theta_1 = \cos^{-1}\left(\frac{I_q^*}{\sqrt{2} I_{x\_max}}\right) \quad (I_q^* \geq 0)$$

$$\cos^{-1}\left(\frac{-I_q^*}{\sqrt{2} I_{x\_max}}\right) \quad (I_q^* < 0)$$

$$\theta_2 = \cos^{-1}\left(\frac{-I_q^*}{\sqrt{2} I_{x\_max}}\right) \quad (I_q^* \geq 0)$$

-continued $$\cos^{-1}\left(\frac{I_q^*}{\sqrt{2} I_{x\_max}}\right) \quad (I_q^* < 0)$$

$$\theta_3 = 2\pi - \theta_2$$

$$\theta_4 = 2\pi - \theta_1$$

in the case that the failure of electric current flow has occurred in the V phase, and θ1<θ<π6 or 7π6<θ<θ4:

$$I_d^* = I_{x\_max}\left(\sqrt{\frac{3}{2}} \cos\theta + \sqrt{\frac{1}{2}} \sin\theta\right) \, (I_q^* \geq 0) \qquad (28)$$

$$I_d^* = -I_{x\_max}\left(\sqrt{\frac{3}{2}} \cos\theta + \sqrt{\frac{1}{2}} \sin\theta\right) \, (I_q^* < 0) \qquad (29)$$

in the case that the failure of electric current flow has occurred in the V phase, and π6<θ<θ2 or θ3<θ<7π6:

$$I_d^* = -I_{x\_max}\left(\sqrt{\frac{3}{2}} \cos\theta + \sqrt{\frac{1}{2}} \sin\theta\right) \, (I_q^* \geq 0) \qquad (30)$$

$$I_d^* = I_{x\_max}\left(\sqrt{\frac{3}{2}} \cos\theta + \sqrt{\frac{1}{2}} \sin\theta\right) \, (I_q^* < 0) \qquad (31)$$

(in the case that the failure of electric current flow has occurred in the V phase, θ1 to θ4 satisfy the following expressions, in which Iq* indicates the q-axis electric current command value, and Ix_max indicates the upper limit of the applicable electric current value), $$\theta_1 = \sin^{-1}\left(\frac{-I_q^*}{\sqrt{2} I_{x\_max}}\right) + \frac{\pi}{6} \quad (I_q^* \geq 0)$$

$$\sin^{-1}\left(\frac{I_q^*}{\sqrt{2} I_{x\_max}}\right) + \frac{\pi}{6} \quad (I_q^* < 0)$$

$$\theta_2 = \sin^{-1}\left(\frac{I_q^*}{\sqrt{2} I_{x\_max}}\right) + \frac{\pi}{6} \quad (I_q^* \geq 0)$$

$$\sin^{-1}\left(\frac{-I_q^*}{\sqrt{2} I_{x\_max}}\right) + \frac{\pi}{6} \quad (I_q^* < 0)$$

$$\theta_3 = \frac{4\pi}{3} - \theta_2$$

$$\theta_4 = \frac{4\pi}{3} - \theta_1$$

in the case that the failure of electric current flow has occurred in the W phase, and θ1<θ<5π6 or 11π6<θ<θ4:

$$I_d^* = I_{x\_max}\left(-\sqrt{\frac{3}{2}} \cos\theta + \sqrt{\frac{1}{2}} \sin\theta\right) \, (I_q^* \geq 0) \qquad (32)$$

-continued $$I_d^* = -I_{x\_max}\left(-\sqrt{\frac{3}{2}}\cos\theta + \sqrt{\frac{1}{2}}\sin\theta\right)\ (I_q^* < 0) \quad (33)$$

in the case that the failure of electric current flow has occurred in the W phase, and $5\pi 6 < \theta < \theta 2$ or $\theta 3 < \theta < 11\pi 6$:

$$I_d^* = -I_{x\_max}\left(-\sqrt{\frac{3}{2}}\cos\theta + \sqrt{\frac{1}{2}}\sin\theta\right)\ (I_q^* \geq 0) \quad (34)$$

$$I_d^* = I_{x\_max}\left(-\sqrt{\frac{3}{2}}\cos\theta + \sqrt{\frac{1}{2}}\sin\theta\right)\ (I_q^* < 0) \quad (35)$$

(in the case that the failure of electric current flow has occurred in the W phase, $\theta 1$ to $\theta 4$ satisfy the following expressions, in which Id* indicates the d-axis electric current command value, Iq* indicates the q-axis electric current command value, and Ix_max indicates the upper limit of the applicable electric current value), $$\theta_4 = \sin^{-1}\left(\frac{I_q^*}{\sqrt{2}\,I_{x\_max}}\right) - \frac{\pi}{6}\ (I_q^* \geq 0)$$

$$\sin^{-1}\left(\frac{-I_q^*}{\sqrt{2}\,I_{x\_max}}\right) - \frac{\pi}{6}\ (I_q^* < 0)$$

$$\theta_3 = \sin^{-1}\left(\frac{-I_q^*}{\sqrt{2}\,I_{x\_max}}\right) - \frac{\pi}{6}\ (I_q^* \geq 0)$$

$$\sin^{-1}\left(\frac{I_q^*}{\sqrt{2}\,I_{x\_max}}\right) - \frac{\pi}{6}\ (I_q^* < 0)$$

$$\theta_2 = \frac{2\pi}{3} - \theta_3$$

$$\theta_1 = \frac{2\pi}{3} - \theta_4$$

8. A motor controller according to claim 6, wherein the electric current command value calculating section calculates the phase electric current command value on the basis of any of the following expressions (36) to (38) in correspondence to the phase of the motor in which the failure of electric current flow has occurred:

in the case that a failure of electric current flow has occurred in the U phase:

$$I_v^* = \frac{I_q^*}{\sqrt{2}\cos\theta} \quad (36)$$

in the case that a failure of electric current flow has occurred in the V phase:

$$I_u^* = \frac{-I_q^*}{\sqrt{2}\sin\left(\theta - \frac{\pi}{6}\right)} \quad (37)$$

in the case that a failure of electric current flow has occurred in the W phase:

$$I_v^* = \frac{I_q^*}{\sqrt{2}\sin\left(\theta + \frac{\pi}{6}\right)} \quad (38)$$

(in the expressions (36) to (38), θ indicates a rotation angle, Iq* indicates a q-axis electric current command value, Iu* indicates a U-phase electric current command value, and Iv* indicates a V-phase electric current command value), wherein the guarding section limits the phase electric current command value within a range expressed by the following expression (39):

$$-I_{x\_max} \leq I_x^{**} \leq I_{x\_max} \quad (39)$$

(in the expression (39), Ix** indicates a phase electric current command value, and Ix_max indicates an upper limit of an applicable phase electric current value), wherein the anomaly detecting section calculates a resultant vector of the d-axis electric current command value and the q-axis electric current command value as the hypothetical electric current command value on the basis of any of the following expressions (40) to (42), in the case of detecting that a failure of electric current flow has occurred in any phase of the motor:

in the case that a failure of electric current flow has occurred in the U phase:

$$I_{dq}^* = \sqrt{\frac{2I_q^{*2}}{\cos 2\theta + 1}} \quad (40)$$

in the case that a failure of electric current flow has occurred in the V phase:

$$I_{dq}^* = 2\sqrt{\frac{I_q^{*2}}{2 - \cos 2\theta - \sqrt{3}\sin 2\theta}} \quad (41)$$

in the case that a failure of electric current flow has occurred in the W phase:

$$I_{dq}^* = 2\sqrt{\frac{I_q^{*2}}{2 - \cos 2\theta + \sqrt{3}\sin 2\theta}} \quad (42)$$

(in the expressions (40) to (42), Idq* indicates a resultant vector of the d-axis electric current command value and the q-axis electric current command value, and Iq* indicates a q-axis electric current command value), wherein, in the case of detecting that a failure of electric current flow has occurred in any phase of the motor, the anomaly detecting section calculates the resultant vector of the d-axis electric current command value and the q-axis electric current command value, on the basis of the following expression (43), if the rotation angle of the motor exists in the range in which the phase electric current command value is limited by the guarding section:

$$I_{dq}^* = \sqrt{2}I_{x\_max} \quad (43)$$

(in the expression (43), Idq* indicates the resultant vector of the d-axis electric current command value and the q-axis electric current command value, and Ix_max indicates an upper limit of the applicable electric current value).

9. An electric power steering apparatus having the motor controller according to claim 6.

10. A motor controller comprising:
a motor control signal output section; and
a drive circuit feeding a three phase drive power to a motor on the basis of a motor control signal output from the motor control signal output section,
wherein the motor control signal output section includes:
an electric current command value calculating section;
a motor control signal generating section generating the motor control signal by executing an electric current feedback control of a d/q coordinate system on the basis of an electric current command value calculated by the electric current command value calculating section; and
an anomaly detecting section for detecting an anomaly of a control system and a failure of electric current flow in any of the phases of the motor,
wherein, in a case that a failure of electric current flow occurred in any of the phases of the motor is detected by the anomaly detecting section, the electric current command value calculating section calculates a phase electric current command value changing in accordance with a secant curve or a cosecant curve with an asymptotic line at a predetermined rotation angle corresponding to the phase in which a failure of electric current flow has occurred, and the motor control signal generating section generates a motor control signal for energizing the other two phases than the phase in which the failure of electric current flow has occurred, by executing a phase electric current feedback control on the basis of the calculated phase electric current command value, and
wherein the anomaly detecting section executes the anomaly detection of the control system on the basis of a phase electric current deviation of at least one of two phases in which the failed electric current flow is not generated, in the case of detecting that a failure of electric current flow has occurred in any of the phases of the motor.

11. An electric power steering apparatus having the motor controller according to claim 10.

12. A motor controller comprising:
a motor control signal output section; and
a drive circuit feeding a three phase drive power to a motor on the basis of a motor control signal output from the motor control signal output section,
wherein the motor control signal output section includes:
an electric current command value calculating section;
a motor control signal generating section generating the motor control signal by executing an electric current feedback control on the basis of an electric current command value calculated by the electric current command value calculating section; and
an anomaly detecting section for detecting an anomaly of a control system and a failure of electric current flow in any of the phases of the motor,
wherein, in a case of detecting that the failure of electric current flow has occurred in any of the phases of the motor, the anomaly detecting section executes the anomaly detection of the control system on the basis of a total value of the phase electric current values of two phases in which the failure of electric current flow has not been occurred.

13. An electric power steering apparatus having the motor controller according to claim 12.

* * * * *